United States Patent
Ramamoorthy et al.

(10) Patent No.: US 6,816,787 B2
(45) Date of Patent: Nov. 9, 2004

(54) GENERATING AND DISPLAYING A VIRTUAL CORE AND A VIRTUAL PLUG ASSOCIATED WITH A SELECTED PIECE OF THE VIRTUAL CORE

(75) Inventors: Raghu Ramamoorthy, Pune (IN); Ashok Srivastava, Haryana (IN); Amr Essawi, Cairo (EG); William Dean Gibson, North Bay (CA)

(73) Assignee: Schlumberger Technology Corporation, Sugar Lang, TX (US)

( * ) Notice: Subject to any disclaimer, the term of this patent is extended or adjusted under 35 U.S.C. 154(b) by 0 days.

(21) Appl. No.: 10/403,735

(22) Filed: Mar. 31, 2003

(65) Prior Publication Data

US 2004/0204857 A1 Oct. 14, 2004

(51) Int. Cl.[7] ................................................. G01V 3/18
(52) U.S. Cl. ........................................................... 702/7
(58) Field of Search ........................... 702/6, 7, 10–14; 367/73

(56) References Cited

U.S. PATENT DOCUMENTS

| | | | |
|---|---|---|---|
| 4,646,240 A | * | 2/1987 | Serra et al. .................... 702/11 |
| 5,668,475 A | | 9/1997 | Orban et al. |
| 6,018,497 A | | 1/2000 | Gunasekera |
| 6,101,445 A | | 8/2000 | Alvarado et al. |
| 6,181,138 B1 | * | 1/2001 | Hagiwara et al. ........... 324/338 |
| 6,278,949 B1 | | 8/2001 | Alam |
| 6,374,185 B1 | * | 4/2002 | Taner et al. .................... 702/6 |
| 6,389,360 B1 | | 5/2002 | Alft et al. |
| 2002/0013687 A1 | | 1/2002 | Ortoleva |
| 2002/0050989 A1 | | 5/2002 | Sanstrom |
| 2003/0223620 A1 | * | 12/2003 | Anxionnaz et al. ......... 382/109 |

FOREIGN PATENT DOCUMENTS

| | | |
|---|---|---|
| EP | 0 367 495 A3 | 3/1992 |
| EP | 1 016 883 A1 | 7/2000 |
| EP | 1 070 970 | 1/2001 |

OTHER PUBLICATIONS

Retrieved from URLC http://www.sis.slb.com/content/software/reservoir/geoframe/visualization/geoviz explore.asp> [Mar. 2, 2003].

* cited by examiner

Primary Examiner—Donald McElheny, Jr.
(74) Attorney, Agent, or Firm—Kevin P. McEnaney; Brigitte L. Echols; John J. Ryberg

(57) ABSTRACT

A visualization application will generate a Virtual Core representing a compilation of any formation property data, the compilation being a 2 and 1/2 D representation of any formation property. The compilation is generated by creating, in response to an integrated formation evaluation in 1D, a 2 and 1/2 D representation of each 1D formation property in the 1D formation evaluation, when the 1D property can be related to the 2 and 1/2 D physical magnitude combining the 2 and 1/2 D physical magnitude image with the 1D facies log thereby generating a 2 and 1/2 D facies image. The Software will also generate a Virtual Plug representing an average estimate of all formation properties over a prescribed surface or volume in the vicinity of a selection made on the compilation (i.e., on the Virtual Core). When an interaction with the Virtual Core occurs, all results generated by those interactions will be restored.

25 Claims, 9 Drawing Sheets

| END MEMBER PROPERTY TABLE ||||||| 
| --- | --- | --- | --- | --- | --- | --- |
| | AVERAGE PROPERTIES ||||||
| ROCK FACIES | WCLA | WSAN | SMG | BMK | SWIRR | SOR |
| COARSE GRAINED SANDSTONE | 0.025 | 0.975 | 42 | 38.8 | 0.05 | 0.2 |
| FINE GRAINED SANDSTONE | 0.075 | 0.925 | 40 | 36 | 0.2 | 0.25 |
| SILTSTONE | 0.1 | 0.9 | 36 | 32 | 0.55 | 0.35 |
| SHALE | 0.65 | 0.35 | 23 | 18 | 1 | 0 |

GENERATING AND DISPLAYING A VIRTUAL CORE AND A VIRTUAL PLUG ASSOCIATED WITH A SELECTED PIECE OF THE VIRTUAL CORE

BACKGROUND OF THE INVENTION

The subject matter of the present invention relates to a method and apparatus for generating and displaying a virtual core analogous to a sample of a portion of the Earth formation which might be retrieved from a formation during the drilling of a wellbore (called a core), for generating and displaying a virtual plug analogous to a sample (called a plug) obtained from the core that might be retrieved from the formation during the drilling of the wellbore, and for saving/archiving one or more interactions which may be performed in connection with the virtual core.

A core is a cylindrical piece of rock that is acquired during the drilling of the wellbore. This core will be referenced as the solid core to distinguish it from the virtual core. Several measurements are made on the core which address the evaluation of the formation, and information from those measurements are incorporated into the studies of various discipline groups. Oil companies also acquire measurements, known as well logging measurements, in the wellbore of the rock formations surrounding the wellbore. If these same measurements (such as well logging measurements) could be used to describe the rock and present the rock in the form of a virtual core, data from the previous measurements (such as well logging measurements) could be translated into a form analogous to measurements performed on a solid core. Recall that the client or customer might already obtain measurements on a solid core. Therefore, if the customer has a virtual core, that customer could immediately compare any received virtual core information (which has been given to him by the subject company and represents well logging measurements) with his own measurements on the solid core and then utilize the results of that comparison to validate/calibrate the characterization of the reservoir or Earth formation located adjacent to the solid core. Therefore, the virtual core is a way of characterizing the reservoir in terms with which the customer is already familiar. The solid core permits characterization of the formation on the scale of a few centimeters. To be comparable, use of the log information is needed to describe the formation as a virtual core to similar resolution. Today, some measurements can be made on the formation at the borehole wall and placed in the form of an image that provides a spatial resolution in the order of centimeters. Other measurements can be made on the formation and recorded in the form of a log. These, typically, provide an average value at each depth in the borehole and have a spatial resolution from a few centimeters to several feet. If all such measurements can be combined, it may be possible to describe the rock on a scale similar to those on the solid core. However, such a description will be in a continuous, digital form. By using the virtual core, all aspects of the rock are available in response to the touch of a button.

In addition, some present day systems make measurements on an earth formation utilizing a well-logging tool to generate a well-log and then determine certain rock parameters from the obtained well-log, such as porosity, permeability, oil space, saturation. The log, which is a measurement of the earth formation extending outwardly from the borehole wall, can be used to create a virtual core, which is a description of the Earth formation disposed at the surface of the borehole wall. In addition, the customer extracts a piece, called a plug, from the formation rock in the solid core and he makes the same measurements on the plug, which is, typically, about one-inch diameter by one-inch long. Petrophysical properties (such as porosity, for example) measured from the plug are routinely compared to that measured from the log. Without cutting the entire one and one half feet of rock into several plugs and then averaging the measurements, incomplete and sometimes inaccurate comparisons are made. Having the aforementioned digital continuous description of a virtual core, if software could be utilized to select a corresponding point on the virtual core, then average the properties over an inch, both cylindrically and longitudinally, around the selected point, in effect, an estimate is made of the petrophysical property over similar volumes. If it is known in which direction a solid plug is taken, or the depth at which the solid plug is sampled, and if a virtual plug of the virtual core is made at the same depth and the same direction, an accurate comparison can be made.

With the solid core, information can be extracted over only one short piece of the entire length of the wellbore. Therefore, assuming possession of only one short piece of a solid core, if it is confirmed that the short piece of solid core matches a corresponding short piece of the virtual core, then a higher confidence exists that all other short pieces of solid core, if obtained, along the entire length of the wellbore would also match all other corresponding short pieces of the virtual core.

Having the formation properties captured in the form of a Virtual Core in digital format enables several computations to be interactively performed by the customer to simulate different scenarios. For example, an average of certain properties over specified formation intervals may be determined. This enables computation of the volumes of several fluids that are present in a reservoir thereby enabling an improved evaluation of the reservoir's commercial value. In addition, simulations may be made of several different completion and production scenarios. From these simulations, a preferred scenario may be selected for a specific implementation that best matches the objectives for the well. The results of any or all of the above such interactions needs to be captured and the virtual core provides for a digital means to do this. Hence, the Virtual Core remains a current archive of our knowledge of the formation properties at a well and of our use of such knowledge in the shaping of reservoir management decisions.

SUMMARY OF THE INVENTION

An aspect of the present invention includes a program storage device readable by a machine, tangibly embodying a program of instructions executable by the machine, to perform method steps for generating a compilation of formation property data as a function of depth and azimuth in a wellbore, the method steps comprising: creating, in response to an integrated formation evaluation which includes one or more physical measurements as functions of depth in a wellbore and one or more formation properties as functions of depth in a wellbore and a facies log measurement as a function of depth in the wellbore and an image as a function of depth and azimuth in the wellbore of a physical measurement, a representation of the physical measurements and formation properties as functions of depth and azimuth in the wellbore on the condition that the each of the physical measurements and each of the formation properties as a function of depth in the wellbore can be related to the physical measurement in the image; and combining the physical measurement image as a function of depth and azimuth in the wellbore with the facies log measurement as a function of depth in the wellbore thereby generating a facies image as a function of depth and azimuth in the wellbore and determining a representation of any formation property as a function of depth and azimuth in the wellbore corresponding to the facies image on the condition that the formation property cannot be related to the physical measurement image.

A further aspect of the present invention includes a method of generating a compilation of formation property data as a function of depth and azimuth in a wellbore, the method comprising: creating, in response to an integrated formation evaluation which includes one or more physical measurements as functions of depth in a wellbore and one or more formation properties as functions of depth in a wellbore and a facies log measurement as a function of depth in the wellbore and an image as a function of depth and azimuth in the wellbore of a physical measurement, a representation of the physical measurements and formation properties as functions of depth and azimuth in the wellbore on the condition that the each of the physical measurements and each of the formation properties can be related to the physical measurement in the image; and combining the physical measurement image as a function of depth and azimuth in the wellbore with the facies log measurement as a function of depth in the wellbore thereby generating a facies image as a function of depth and azimuth in the wellbore and determining a representation of any formation property as a function of depth and azimuth in the wellbore corresponding to the facies image on the condition that the formation property cannot be related to the physical measurement image.

A further aspect of the present invention involves a program storage device readable by a machine, tangibly embodying a program of instructions executable by the machine, to perform method steps for generating a compilation of formation property data as a function of depth and azimuth in a wellbore, the method steps comprising: creating, in response to an integrated formation evaluation which includes one or more formation petrophysical properties as a function of depth in a wellbore, an interpreted electro-facies log as a function of depth in the wellbore and a multi-dimensional image of a physical magnitude such as, for example, electrical resistivity or acoustic impedance as a function of depth and azimuth in a wellbore, a representation as a function of depth and azimuth in the wellbore of the formation properties on the condition that the physical measurement in the multi-dimensional image can be related to each of the said formation properties; and combining the aforesaid multi-dimensional physical magnitude image as a function of depth and azimuth in the wellbore with the facies log measurement as a function of depth in the wellbore thereby generating a facies image as a function of depth and azimuth in the wellbore and determining a representation of any formation property as a function of depth and azimuth in the wellbore corresponding to the facies image on the conditions that a) the said formation property cannot be directly related to the physical magnitude in the image measurement and b) an average value of each such formation property can be assigned to each facies type on the facies image.

A further aspect of the present invention includes a method of generating a compilation of formation property data as a function of depth and azimuth in a wellbore, the method comprising: creating, in response to an integrated formation evaluation which includes one or more formation petrophysical properties as a function of depth in a wellbore, an interpreted electro-facies log as a function of depth in the wellbore and a multidimensional image of a physical magnitude such as, for example, electrical resistivity or acoustic impedance as a function of depth and azimuth in a wellbore, a representation as a function of depth and azimuth in the wellbore of the formation properties which are functions of depth in the wellbore on the condition that the physical measurement in the multi-dimensional image can be related to the said formation properties; and combining the aforesaid multi-dimensional physical magnitude image as a function of depth and azimuth in the wellbore with the facies log measurement as a function of depth in the wellbore thereby generating a facies image as a function of depth and azimuth in the wellbore and determining a representation of any formation property as a function of depth and azimuth in the wellbore corresponding to the facies image on the conditions that a) the said formation property cannot be related to the physical magnitude in the image measurement and b) an average value of each such formation property can be assigned to each facies type on the facies image.

A further aspect of the present invention involves a program storage device readable by a machine, tangibly embodying a program of instructions executable by the machine, to perform method steps for generating a compilation of formation property data representing a 2 and ½ D representation of any formation property, the method steps comprising: (a) generating an integrated formation evaluation in 1D including one or more physical 1D measurements, one or more interpreted formation properties, a 1D facies log and a 2 and ½ D measurement of a physical magnitude such as, for example, resistivity or acoustic impedence; (b) in response to the 1D property from the integrated formation evaluation and the 2 and ½ D physical magnitude measurement, creating a 2 and ½ D representation of the formation property on the condition that the said property can be related to the 2 and ½ D physical magnitude (c) in response to the 1D facies log and to the 2 and ½ D physical magnitude image, creating a 2 and ½ D representation of the facies, and (d) determining average values of any formation property for each facies type encountered in the facies log and, in combination with the 2 and ½ D facies image generated in step (c) above, generating a 2 and ½ D representation of any formation property on the condition that the said formaton property cannot be related to the measured 2 and ½ D physical magnitude as in step (b).

A further aspect of the present invention involves a method of generating a compilation of formation property data representing a 2 and ½ D representation of any formation property, the method comprising: (a) generating an integrated formation evaluation in 1D including one or more physical 1D measurements, one or more interpreted formation properties, a 1D facies log and a 2 and ½ D measurement of a physical magnitude such as, for example, resistivity or acoustic impedence; (b) in response to the 1D property from the integrated formation evaluation and the 2 and ½ D physical magnitude measurement, creating a 2 and ½ D representation of the formation property on the condition that the said property can be related to the 2 and ½ D physical magnitude (c) in response to the 1D facies log and to the 2 and ½ D physical magnitude image, creating a 2 and ½ D representation of the facies, and (d) determining average values of any formation property for each facies type encountered in the facies log and, in combination with the 2 and ½ D facies image generated in step (c) above, generating a 2 and ½ D representation of any formation property on the condition that the said formaton property cannot be related to the measured 2 and ½ D physical magnitude as in step (b).

A further aspect of the present invention involves a program storage device readable by a machine, tangibly embodying a program of instructions executable by the machine, to perform method steps that are responsive to a compilation of formation property data representing a 2 and ½ D representation of any formation property for deriving an average estimate of all formation properties over a prescribed surface or volume in the vicinity of a selection made on the compilation, the method steps comprising: selecting a location on the compilation, the compilation including one or more formation properties; and estimating an average of each formation property that falls within a predetermined diameter around the location on the compilation which was selected in the selecting step.

A further aspect of the present invention involves a method responsive to a compilation of formation property data representing a 2 and ½ D representation of any formation property for deriving an average estimate of all formation properties over a prescribed surface or volume in the vicinity of a selection made on the compilation, the method comprising: selecting a location on the compilation, the compilation including one or more formation properties; and estimating an average of each formation property that falls within a predetermined diameter around the location on the compilation which was selected in the selecting step.

A further aspect of the present invention involves a program storage device readable by a machine, tangibly embodying a program of instructions executable by the machine, to perform method steps for deriving an average estimate of all formation properties over a prescribed surface or volume, the method steps comprising: (a) generating an integrated formation evaluation in 1D including one or more physical 1D measurements, one or more interpreted formation properties, a 1D facies log and a 2 and ½ D measurement of a physical magnitude such as, for example, resistivity or acoustic impedence; (b) in response to the 1D property from the integrated formation evaluation and the 2 and ½ D physical magnitude measurement, creating a 2 and ½ D representation of the formation property on the condition that the said property can be related to the 2 and ½ D physical magnitude (c) in response to the 1D facies log and to the 2 and ½ D physical magnitude image, creating a 2 and ½ D representation of the facies, and (d) determining average values of any formation property for each facies type encountered in the facies log and, in combination with the 2 and ½ D facies image generated in step (c) above, generating a 2 and ½ D representation of any formation property on the condition that the said formaton property cannot be related to the measured 2 and ½ D physical magnitude as in step (b), (e) selecting a location on the compilation, the compilation including one or more formation properties; and (f) estimating an average of each formation property that falls within a predetermined diameter around the location on the compilation which was selected in the selecting step.

A further aspect of the present invention involves a method for deriving an average estimate of all formation properties over a prescribed surface or volume, the method comprising: (a) generating an integrated formation evaluation in 1D including one or more physical 1D measurements, one or more interpreted formation properties, a 1D facies log and a 2 and ½ D measurement of a physical magnitude such as, for example, resistivity or acoustic impedence; (b) in response to the 1D property from the integrated formation evaluation and the 2 and ½ D physical magnitude measurement, creating a 2 and ½ D representation of the formation property on the condition that the said property can be related to the 2 and ½ D physical magnitude (c) in response to the 1D facies log and to the 2 and ½ D physical magnitude image, creating a 2 and ½ D representation of the facies, and (d) determining average values of any formation property for each facies type encountered in the facies log and, in combination with the 2 and ½ D facies image generated in step (c) above, generating a 2 and ½ D representation of any formation property on the condition that the said formaton property cannot be related to the measured 2 and ½ D physical magnitude as in step (b), (e) selecting a location on the compilation, the compilation including one or more formation properties; and (f) estimating an average of each formation property that falls within a predetermined diameter around the location on the compilation which was selected in the selecting step.

A further aspect of the present invention involves a program storage device readable by a machine, tangibly embodying a program of instructions executable by the machine, to perform method steps responsive to a compilation of formation property data as a function of depth and azimuth in a wellbore for interacting with the compilation, the method steps comprising: interacting with the compilation of formation property data as a function of depth and/or azimuth in a wellbore thereby generating at least one result; and storing the at least one result back into the compilation in response to the interacting step.

A further aspect of the present invention involves a method responsive to a compilation of formation property data as a function of depth and azimuth in a wellbore for interacting with the compilation, the method comprising: interacting with the compilation of formation property data as a function of depth and azimuth in a wellbore thereby generating at least one result; and storing the at least one result back into the compilation in response to the interacting step.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein.

DETAILED DESCRIPTION OF THE PREFERRED EMBODIMENT

Figure 1:
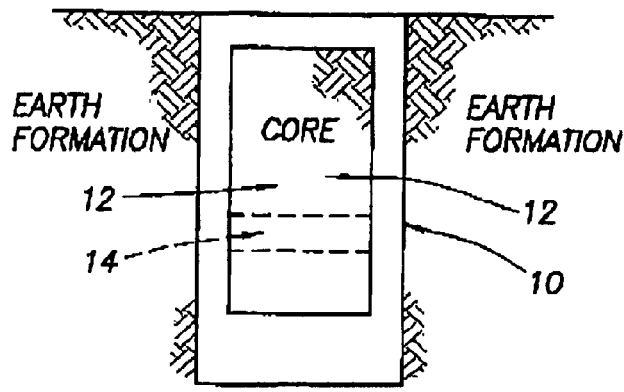
FIG. 1 illustrates a solid core extracted from an earth formation during drilling of the wellbore.

Well bore formation evaluation data is represented as a digital entity called a "Virtual Core" through a novel procedure to integrate existing well log data that enables a company to deliver formation evaluation results to a customer in a concise and easy to use form that simultaneously maximizes the value of the information and its implications on the customers reservoir management decisions. The Virtual Core is a digital description of the formation surrounding the borehole at a spatial resolution comparable to that obtainable on solid cores obtained from the same formation. The Virtual Core digital entity represents a dynamic record of all data acquired on a well and serves as a platform for complete archiving. By using the Virtual Core digital entity, the customer is able to query the data at will and perform computations on the entire data or subset thereof, such as, for example, simulate different completion and production scenarios, and evaluate the resultant outcomes. Results of all interactions are recorded to the Virtual Core digital entity such that it remains a current archive of the data and evaluations on the subject well.

A novel procedure herein prescribed permits the integration of low resolution 1 dimensional (1D) log data with high resolution 2 and ½ D borehole images to generate a complete description of the formation in high resolution 2 and ½ D domain in a continuous, digital form.

The term 1D as in 1D log data will hereinafter mean: log data as a function of depth in a borehole. The term 2 and ½ D as in 2 and ½ D borehole images will hereinafter mean: borehole images as a function of depth and azimuth in a borehole. The term 1D representation of a measurement will hereinafter mean: a representation of the measurement as a function of depth in a wellbore. The term 2 and ½ D representation of a measurement will hereinafter mean: a representation of the measurement as a function of depth and azimuth in a wellbore. Further, although some preferred embodiments discussed herein, are described in terms of 1D, and 2 and ½ D as above defined, it should be understood that multiple dimensional images and representations are generally contemplated along any number of axis without departing from the underlying disclosed principles.

When a wellbore is drilled, a solid piece of the Earth formation located inside the wellbore (called a core or a solid core) may be retrieved during the drilling of the wellbore. Measurements are made by a client or customer on that piece of solid core. The core extends inwardly from the wall of the wellbore and is located inside the wellbore.

Oil service companies, such as Schlumberger Technology Corporation, use their well logging tools to log a well and generate a well log which represents measurements made on the Earth formation which extends outwardly from the wall of the wellbore. Some of the well logging tools have a high axial and azimuthal resolution and, as a result, the resultant well logs can produce accurate measurements of physical quantities such as resistivity or acoustic impedance, down to a centimeter around the face of the wellbore. We term such logs as borehole image logs and we will refer to the property they measure as a primary physical magnitude. When such image logs provide a measure of the primary physical magnitude at a surface around the wellbore (typically, the borehole wall), we call them 2 and ½ D images, which, according to one embodiment, means images as a function of depth and azimuth in a wellbore. Some of the log measurements provide a single value of a physical quantity such as resistivity or bulk density, for example, at each depth averaged over a volume of investigation that might extend from a few inches to several feet along the wellbore. These logs also average the physical quantity either over a fixed and limited azimuthal sector around the borehole or over the entire circumference of the borehole. We will refer to the property they measure as a secondary physical magnitude. It is possible to establish a relationship between the primary and the secondary physical magnitudes and use this relationship to develop a 2 and ½ D image of the secondary physical magnitude (refer to Anxionnaz and Delhomme, European Patent Application EP1016883). The same procedure can also be applied to physical magnitudes of formation properties derived from a combination of one or more of the secondary physical magnitudes. Such a procedure of combining the primary physical magnitudes and secondary physical magnitudes can be used to generate a virtual core.

Borehole image logs today with a spatial resolution of an inch or less provide a measurement of the primary magnitude at or close to the surface of the borehole wall. Hence, they measure the property at a surface. However, there already exist azimuthal resistivity images with a lower spatial resolution of the order of a few inches which provide a measure of the primary magnitude at two or more depths of investigation around the borehole. Such logs provide images at the surface of concentric cylinders at two or more diameters into the formation centered at the well. An example of such a log is the High Resolution Azimuthal Laterolog Sonde (HALS) that generates a deep and a shallow resistivity image around the borehole. Another example is the azimuthal resistivity image of the GeoVision Resistivity (GVR) that provides up to 3 resistivity images at different depths of investigation around the borehole. When such an image log is used as the primary magnitude to generate the virtual core, we are able to generate a true 3D virtual core which will represent the formation properties on a cylindrical shell with inner radius corresponding to the shallowest depth of investigation of the primary magnitude measurement and outer radius corresponding to the deepest depth of investigation of the primary magnitude measurement.

The information that is used to generate and display the virtual core on the workstation or personal computer display screen originates from the well logs that were generated by the well logging tools when the wellbore was logged by said well logging tools. Since the virtual core is generated as a digital representation in 2 and ½ D of all relevant formation properties, a user can select a point on the virtual core to generate a virtual plug. A real plug is typically a one-inch diameter by one-inch long piece of the solid core which was obtained from inside the wellbore when the wellbore was being drilled. Other shapes and sizes of the plug do exist and are included in the scope of this invention. Usually, a plug is obtained by the client or customer from the solid core and the plug is analyzed to determine the Earth formation characteristics in the plug. When a user selects a particular point on the virtual core, the virtual plug generation method is executed, and, as a result, a listing of the characteristics of the formation associated with that portion of the virtual core is generated and displayed. However, the operator sitting at the workstation and viewing the virtual core on the workstation display screen can place the cursor on a selected piece of the virtual core, click on the mouse, and, as a result, a virtual plug is displayed on the workstation display screen. The virtual plug generated comprises a list of parameters corresponding to the average formation properties over a specified shape, for example, a 1" diameter disk, centered at the selected point on the 2 and ½ D virtual core where the cursor was placed. If the virtual core is generated in true 3D as explained before, the formation properties are averaged over the volume included in the specified geometry for the virtual plug centered at the location of the cursor on the virtual core.

As noted earlier, the virtual plug comprises a list of parameters. The list of parameters includes a plurality of columns of parameters (such as porosity and permeability) and a plurality of data values positioned, respectively, under the plurality of columns of parameters, there being one data value for each parameter in the table of parameters. The list can also include charts showing the variation of one parameter (such as wetting phase saturation) as a function of the variation in another parameter (such as capillary pressure).

The digital virtual core enables several other types of interactions and computations to be performed. Some examples are:

1. Annotation of formation intervals, reservoir zones and perforation intervals
2. Computation of average formation properties over specified intervals, such as reservoir zones. Such average properties are critical to asset evaluation.
3. Simulation of production behavior for several different completion and perforation scenarios and selection of the most optimal completion configuration.

The interactions and results thereof can be stored with the digital virtual core such that future access permits the review of all prior interactions on the data. Hence, the virtual core becomes a current archive of both the formation properties and the subsequent evaluations on the same. The digital virtual core can be recorded and delivered on a removable, re-writeable medium, such as a USB flash drive along with the software needed to display and interact with the virtual core. Such a medium becomes a portable record of the formation properties and simulations recorded at a well.

Referring to FIG. 1, a wellbore 10 includes a core 12. When a wellbore is drilled in an Earth formation, the wellbore 10 is created; however, during the drilling, one or more of pieces of formation cores 12 may be retained for analysis. A core 12 (hereinafter called an actual core 12) is a piece of the Earth obtained during the drilling of the wellbore 10; that is, the core 12 is the piece of Earth which has been removed from the formation in order to create the wellbore 10. The actual core 12 is retained for analysis in a laboratory for the purpose of ultimately determining the existence of underground deposits of hydrocarbon in the Earth formation, and laboratory data obtained in response to the laboratory analysis of the core 12 will hereinafter be known as core data. One or more plugs, such as plug 14 in FIG. 1, from the core 12 may also be obtained and analyzed in a laboratory in order to determine various properties of the formation.

Figure 2:
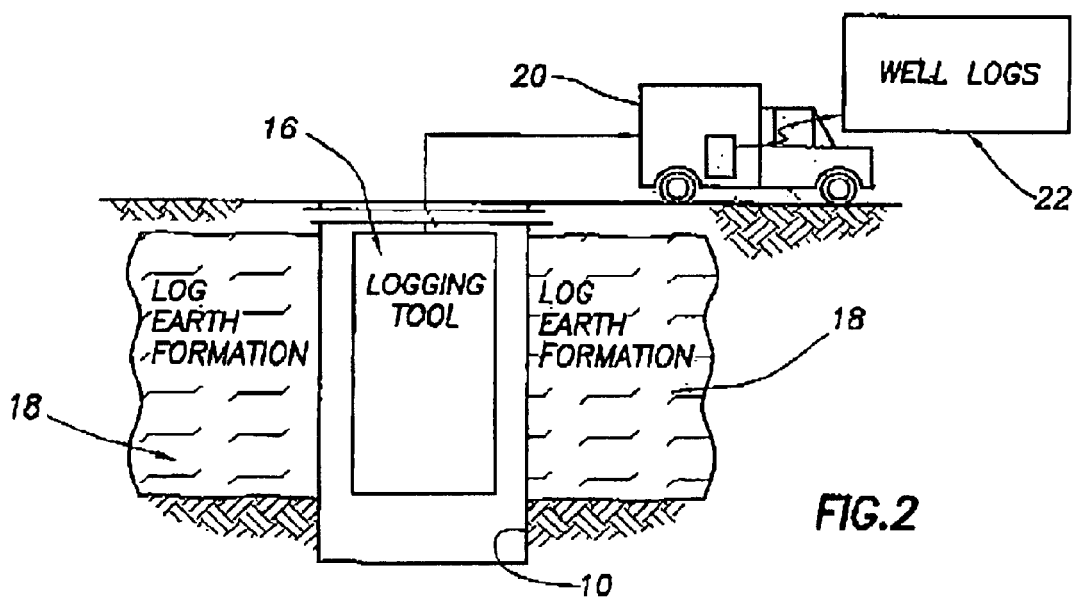
FIG. 2 illustrates a logging tool which logs the formation.

Referring to FIG. 2, during or after the wellbore 10 is drilled, a logging tool 16 is lowered into the wellbore 10. The logging tool 16 is used to log the Earth formation 18 penetrated by the wellbore 10. When the logging tool 16 logs the formation 18 penetrated by the wellbore 10, a well logging unit at surface 20 receives well log data from the logging tool 16 disposed downhole and, responsive thereto, the well logging unit 20 generates an output log 22. That output log 22 is referred to as a well log 22, as shown in FIG. 2, and data obtained from the well log 22 is referred to as log data 22. The portion 18 of the Earth formation that was logged by the logging tool 16 is illustrated in FIG. 2. As a result of the logging by the logging tool 16, various Earth formation characteristics associated with the formation 18, such as resistivity and permeability, can be determined. The well log 22, and any formation property log derived from the said well log, is used to generate the virtual core, as illustrated in FIG. 3.

Figure 3:
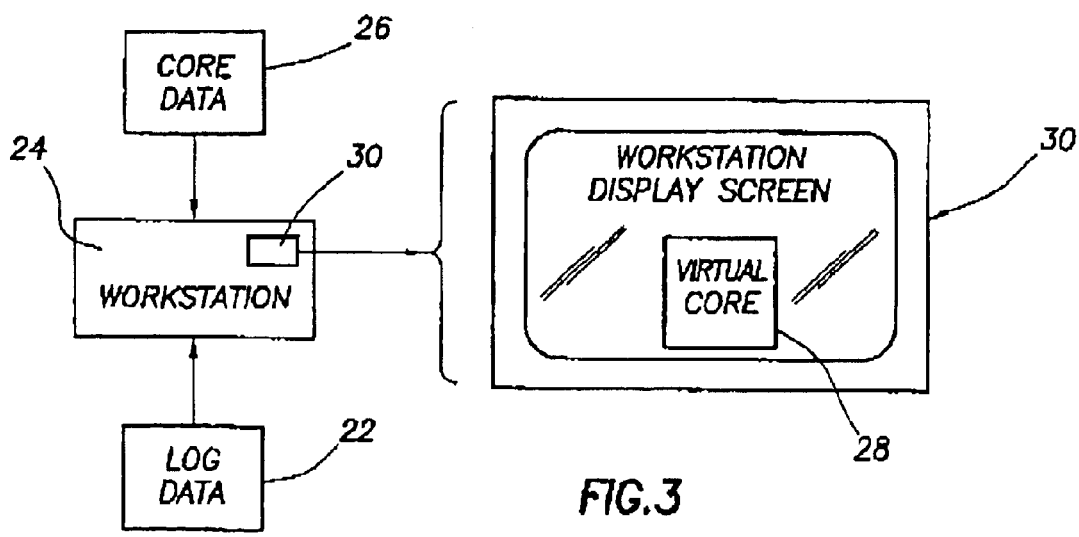
FIG. 3 illustrates a workstation which displays a Virtual Core on the workstation display screen in response to two types of input data: core data and log data.

Referring to FIG. 3, a workstation 24 receives log data 22 and core data 26. When the workstation 24 receives the log data 22 and the core data 26, the virtual core and virtual plug generation software is executed by the workstation processor, and, responsive thereto, a virtual core 28 is generated. The availability of core data is not essential to the process to generate the Virtual Core, however, core data can be used to calibrate the evaluation of formation properties in 1D from the well logs and thereby improve the accuracy of the said properties. As illustrated in FIG. 3, that virtual core 28 is displayed on the workstation display screen 30. The virtual core 28 that is being displayed on the display screen 30 of the workstation 24 is intended to represent and is analogous to the actual core 12 of FIG. 1; that is, instead of drilling a wellbore 10 for the purpose of obtaining an actual core 12 as illustrated in FIG. 1, the well logs 22 that are generated by the logging tool 16 of FIG. 2 can be used to generate and display a virtual core 28 on the workstation display screen 30 of the workstation 24 of FIG. 3.

Figure 4:
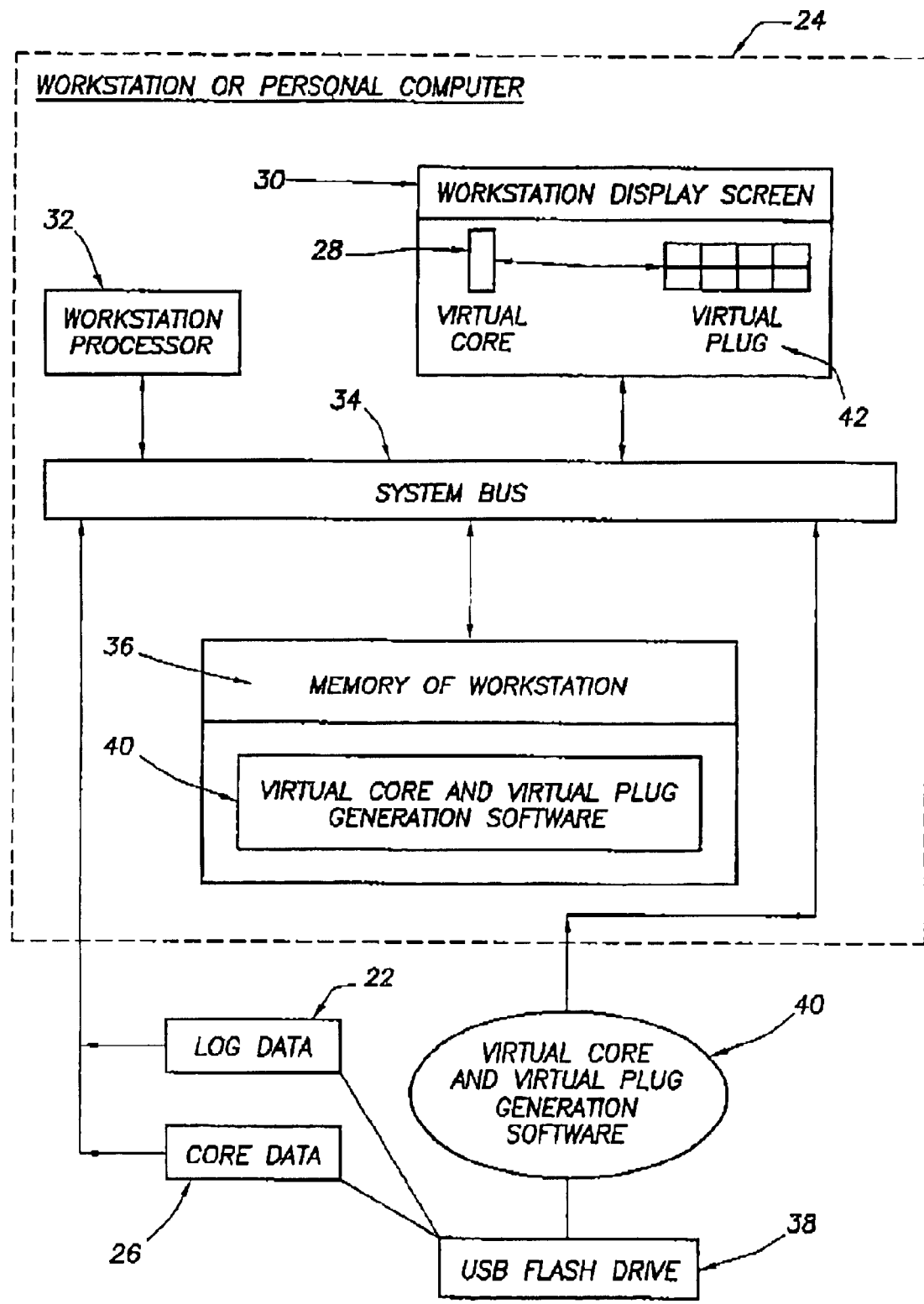
FIG. 4 illustrates a workstation or personal computer including a processor, a recorder or display device including a display screen, and a memory for storing: (1) the Virtual Core and Virtual Plug Generation Software of the present invention, (2) Log and Core data and (3) any results generated by interactions by a user with the Virtual Core Software.

Referring to FIG. 4, the workstation 24 of FIG. 3 is illustrated. The workstation 24 includes a processor 32 operatively connected to a system bus 34, a workstation display screen 30 (or a recorder or other display device) operatively connected to the system bus 34, and a memory 36 operatively connected to the system bus 34. The system bus 34 receives input data in the form of the log data 22 and the core data 26. A USB flash drive 38 stores software thereon which may be loaded into the workstation; for example, a virtual core and virtual plug generation software 40 may be loaded into the memory 36 of the workstation. The same USB flash drive may also store the log data 22 and the core data 26. Once loaded, the virtual core and virtual plug generation software 40 will be stored in the memory 36 of the workstation, and, as a result, that software 40 is adapted to be executed by the processor 32 of the workstation. When the virtual core and virtual plug generation software 40 in the memory 36 is executed by the processor 32, the workstation display screen 30 will display a virtual core 28. When the operator at the workstation selects a particular piece of the virtual core 28, the workstation display screen 30 will further display a table or a chart 42 which represents a virtual plug 42. The generation and display of the virtual core 28 and the table or chart 42 representing the virtual plug will be described in greater detail later in this specification. The workstation or computer system of FIG. 1 may be a personal computer (PC), a workstation, or a mainframe. Examples of possible workstations include a Silicon Graphics Indigo 2 workstation and a Sun SPARC workstation. The processor 32 can be a programmable processor and the memory 36 is both a computer readable medium and a program storage device. The processor 32 may be, for example, a microprocessor, microcontroller, or a mainframe or workstation processor. The memory 36 may be, for example, a hard disk, ROM, CD-Rom, DRAM, or other RAM, flash memory, magnetic storage, optical storage, registers, or other volatile and/or non-volatile memory.

Figure 4A:
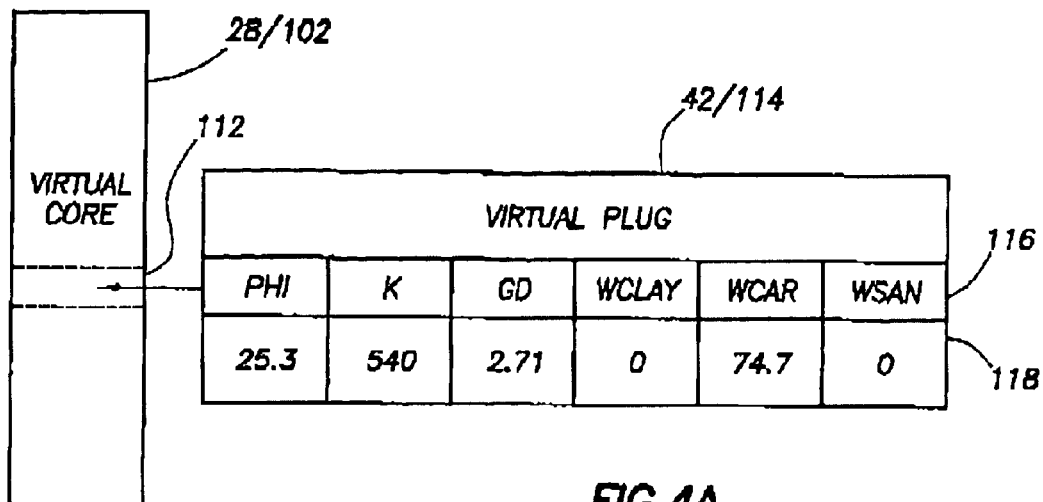
FIG. 4A illustrates the virtual core and the virtual plug which can be displayed on the workstation display screen when the processor executes the Virtual Core and Virtual Plug Generation Software.

Referring to FIG. 4A, the Virtual Core 28 (or 102) of FIG. 4 is illustrated, the Virtual Core representing a compilation of formation property data, the compilation further representing a 2 and ½ D representation of any formation property (the term 2 and ½ D will be discussed below). However, the term "2 and ½ D representation of a formation property" used below can also be stated as follows. "a representation of a formation property as a function of depth and azimuth in a wellbore". In addition, the term "1D representation of a formation property" used below can also be stated as follows: "a representation of a formation property as a function of depth in a wellbore". When a selection is made by a user at location 112 on the compilation 28/102 (i.e., on the Virtual Core 28/102), the Virtual Plug 42 (or 114) of FIG. 4 is generated, the Virtual Plug 42/114 being illustrated in the form of a table. The Virtual Plug 42/114 table includes at least two rows: a first row 116 including formation property parameters, and a second row 118 including data corresponding to each of the formation property parameters. The Virtual Plug 42/114 table in FIG. 4A will include an average estimate of each formation property over a prescribed surface or volume, such as the surface represented by the Virtual Core 28/102 which is a 2 and ½ D representation of the said formation property. The Virtual Plug 42/114 will provide an estimate of the average of each formation property parameter (in the first row 116) that falls within a predetermined diameter around the location 112 on the surface of the Virtual Core compilation 28/102 of FIG. 4A which was selected by the user.

Figure 5:
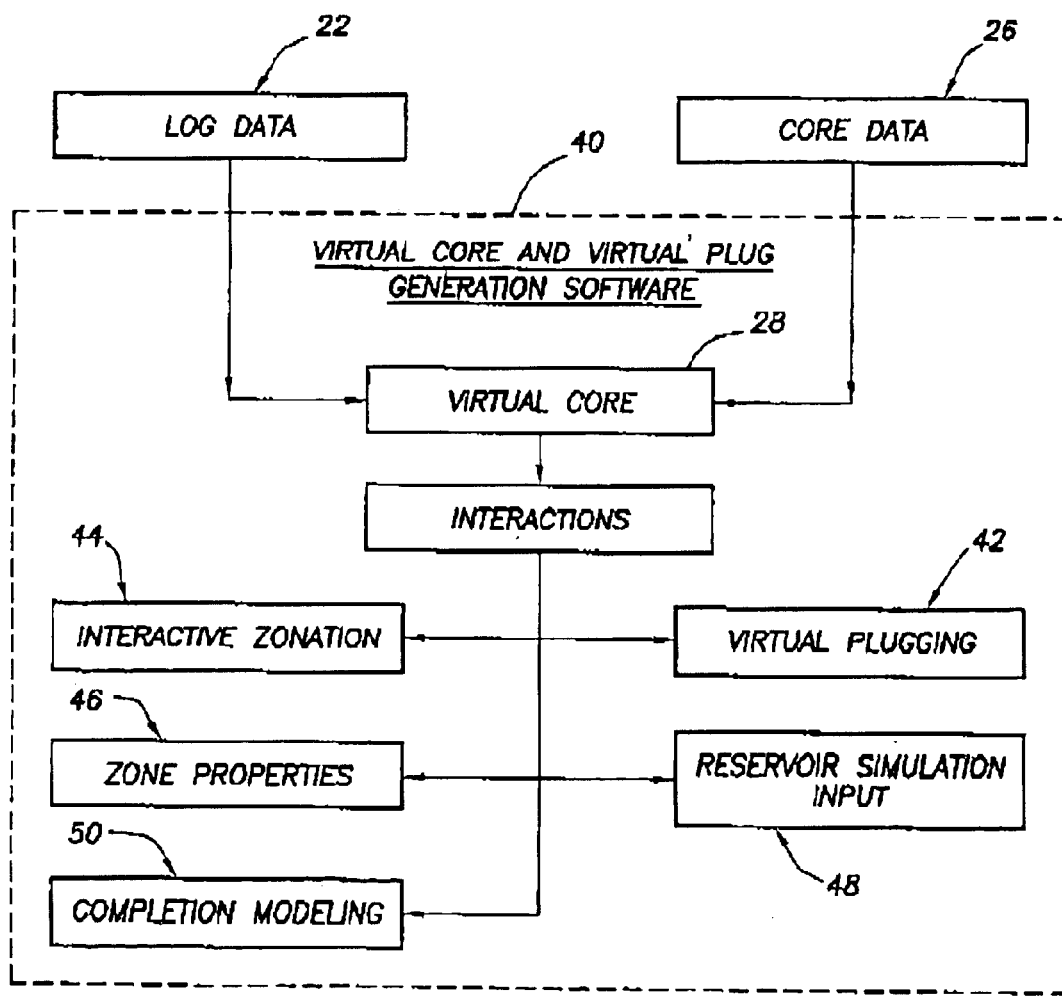
FIG. 5 illustrates a flowchart representing the Virtual Core and Virtual Plug Generation Software of FIG. 4 of the present invention, this flowchart showing log data and core data provided as input data to the Software, a virtual core generated in response to that input data, and examples of various interactions that are possible when the virtual core is generated, such as virtual plugging.

Referring to FIG. 5, a flowchart of the virtual core and virtual plug generation software 40 of FIG. 4 is illustrated. The flowchart of FIG. 5 indicates that the log data 22 and the core data 26 are provided as input data to the virtual core and virtual plug generation software 40 stored in the memory 36 of the workstation 24 of FIG. 4.

The log data 22 and core data 26 input data includes formation evaluation results that are comprised of the following minimum and optional components: (1) minimum components include petrophysical evaluation allocating a unique set of petrophysical parameters to each depth level along the borehole, rock electro-facies evaluation allocating a unique electro-facies to each depth level along the borehole, a borehole image log allocating a physical magnitude such as resistivity or acoustic impedance to each depth and azimuth along the borehole wall and wellbore trajectory data, and (2) optional components include core data for comparison and validation.

In addition, the flowchart of FIG. 5 illustrates how the log data 22 and the core data 26 is used by the virtual core and virtual plug generation software 40 to generate and display the Virtual Core 28 on the workstation display screen 30 of FIG. 4. In addition, the flowchart of FIG. 5 also indicates that, by interacting with the virtual core 28, a plurality of results can be generated. For example, by interacting with the virtual core 28 on the workstation display screen 30 of FIG. 4, a table or chart 42 representing a virtual plug can be generated and displayed on the workstation display screen 30 of FIG. 4. In addition, by interacting with the virtual core 28, other results can be generated, such as interactive zonation 44, zone properties 46, reservoir simulation input 48, and completion modeling 50. These interactions will be discussed in greater detail later in this specification.

Figure 6:
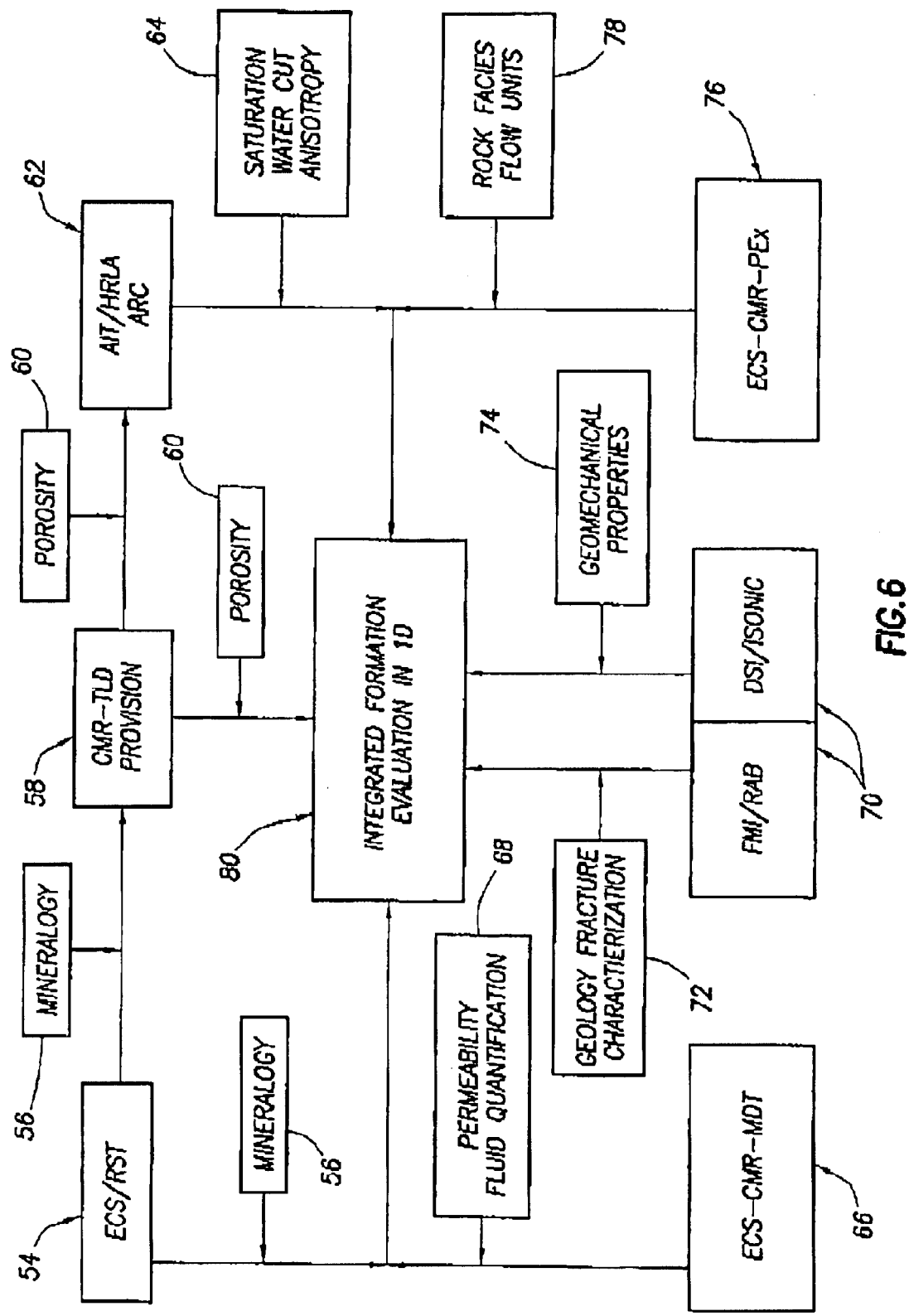
FIGS. 6 illustrates one example of how the log data (which is received as input data by the Virtual Core and Virtual Plug Generation Software) of FIG. 5 is used to generate an integrated formation evaluation in 1D.
Figure 7:
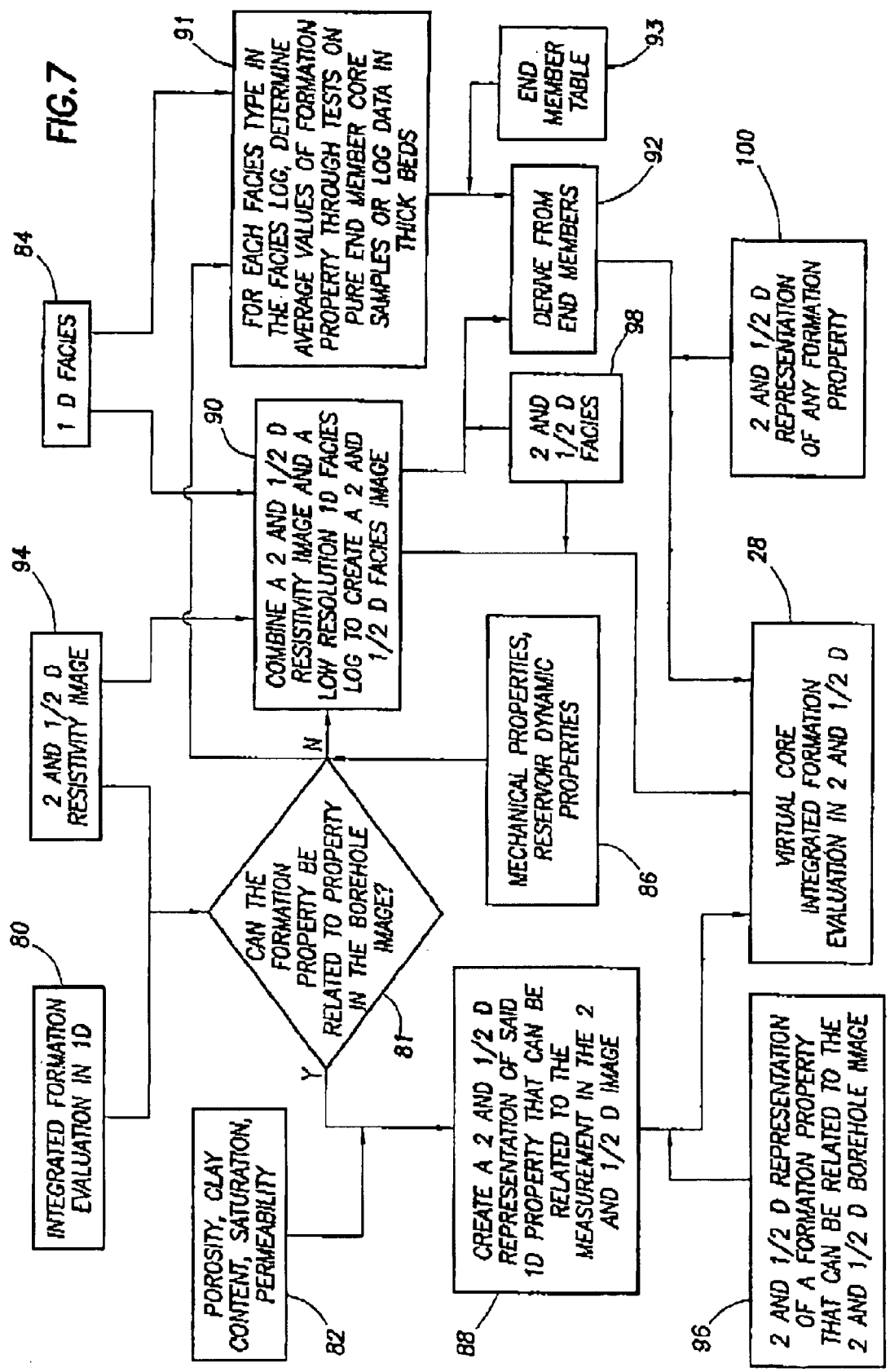
FIG. 7 illustrates a flowchart representing that portion of the Virtual Core and Virtual Plug Generation Software of FIG. 5 which generates the Virtual Core of FIG. 5.
Figures 8, 9:
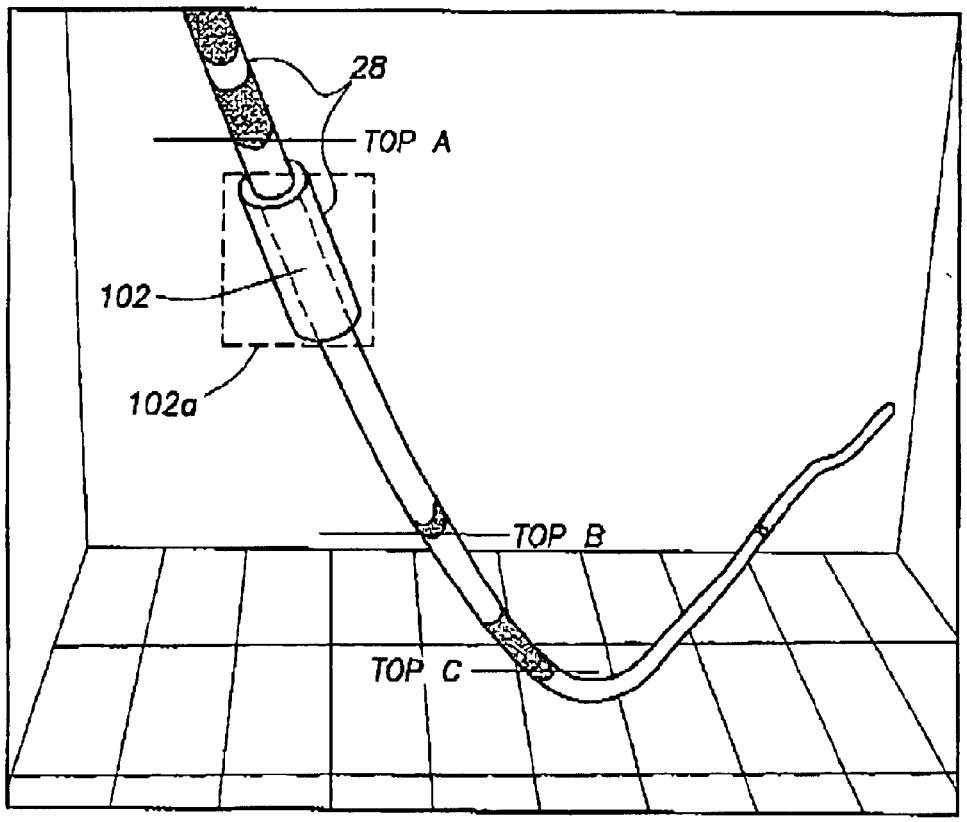
FIG. 8 illustrates an End Member Property Table which is used to generate a 2 and ½ D representation of any formation property which corresponds to a received 2 and ½ D facies image, the End Member Property Table being used in connection with the Derive from End Members step of FIG. 7.
FIG. 9 illustrates a compressed picture of the virtual core along the length of a customers well, the customer zooming in on a particular portion of the customers well at a particular depth.

Referring to FIGS. 6 through 8, the flowcharts of FIGS. 6 and 7 will illustrate how the virtual core 28 is generated and displayed on the workstation display screen 30 of FIG. 4. The End Member Property Table of FIG. 8 is used in connection with step 92 in FIG. 7.

Referring to FIG. 6, a first flowchart is illustrated. The first flowchart of FIG. 6 shows step one in a process for creating the virtual core 28 of FIG. 3 where step one involves the generation and development of the log data 22 in FIGS. 4 and 5, the log data 22 representing an integrated formation evaluation in 1D, a term utilized in step 80 of FIG. 6. FIG. 6 illustrates an interpretation approach. In FIG. 6, we build on the natural strengths of a plurality of logging tools 16 of FIG. 2 to generate the well logs 22 in FIG. 2, the well logs 22 being collectively called log data 22 in FIGS. 4 and 5. This actually simplifies the interpretation. Consequently, FIG. 6 describes the contribution of each of the plurality of logging tools 16 of FIG. 2 that collectively generate the log data 22 in FIGS. 4 and 5 and, ultimately, the integrated formation evaluation in 1D 80 in FIG. 6.

In FIG. 6, the Elemental Capture Spectrometry (ECS) tool and/or the Reservoir Saturation Tool (RST), step 54, provide mineralogy information 56. The Combinable Magnetic Resonance (CMR) tool and/or the Triple Detector Litho Density (TLD) tool and/or the ProVision tool, step 58, provide porosity information 60. The Array Induction Tool (AIT) and/or a High Resolution Laterolog Array (HRLA) tool, step 62, provide saturation, water cut, and resistivity anisotropy information 64. In the meantime, an Elemental Capture Spectrometry (ECS) tool and/or a Combinable Magnetic Resonance (CMR) tool and/or a Modular Dynamics Tester (MDT) tool, step 66, provide permeability and fluid quantification information 68. A Formation Micro Imager (FMI) tool and/or a Resistivity at Bit (RAB) tool and/or a Sonic tool known as the DSI/ISonic, step 70, provide geology and fracture characterization information 72 and geomechanical properties information 74. The Elemental Capture Spectrometry (ECS) tool and/or the Combinable Magnetic Resonance (CMR) tool and/or the Platform Express (PEx) tool, step 76, provide rock facies and flow units information 78. All of the tools referenced in FIG. 6 and referred to above in this paragraph are owned and operated by Schlumberger Technology Corporation of Houston, Texas. In response to receipt of the above referenced information generated by blocks 54, 58, 62, 66, 70 and 76 of FIG. 6, an integrated formation evaluation in one-dimension (1D) 80, is produced. The term one dimension (1D) is defined as follows: the description of a property versus depth in a wellbore is considered 1D; and, with such a description, we have knowledge of one value of a property versus depth in the wellbore with no knowledge of any directional variation in this property in the 360 degrees around the wellbore.

A description of the function set forth in the flowchart of FIG. 6 is discussed hereinbelow.

In FIG. 6, the lithology acquired from the Elemental Capture Spectrometry (ECS) sonde or the Reservoir Saturation Tool (RST) of step 54 can produce an accurate hydrocarbon corrected total and an effective porosity 60 by combining its output 56 with the Nuclear Magnetic Resonance (CMR) and density tools of step 58 and subsequently feeding any resulting porosity information 60 to the saturation and fractional flow logs 64 acquired from one or more array resistivity tools of step 62. We can use the combination of the array induction and array laterolog tools of step 62 for resistivity anisotropy 64. The ECS, Combinable Magnetic Resonance (CMR) and Platform Express (PEx) tools of step 76 allow us to produce reliable rock facies and to delineate flow units 78. The Platform Express PEx tool is disclosed in U.S. Pat. No. 5,668,475 to Orban et al, the disclosure of which is incorporated by reference into this specification. Adding the Modular Dynamics Tester (MDT) of step 66 as a calibration reference permits reliable permeability and capillary pressure curves 68. In step 66, MRF methods and MDT fluid sampling of step 66 produces fluid property quantification 68. All of this results in an Integrated Formation Evaluation in 1D 80 (where the term 1D means a property as a function of wellbore depth only).

Referring to FIG. 7, a second flowchart is illustrated. The second flowchart of FIG. 7 illustrates step two in a process for creating the virtual core 28 in FIG. 3, where step two includes the generation and development of a "virtual core integrated formation evaluation in 2 and ½ D" 28 in response to the "integrated formation evaluation in 1D" 80 generated with reference to FIG. 6. The "virtual core integrated formation evaluation in 2 and ½ D" 28 is a compilation of all formation properties into a digital 2 and ½ D representation. The advantage of that compilation is that it permits various displays and interactions, to be discussed later with reference to FIG. 13.

A description of a property versus depth in a wellbore is considered to be a "1D" description. With such a description, we have knowledge of one value of a property versus depth in the wellbore with no knowledge of any directional variation in this property in the 360 degrees around the wellbore.

A description of a property at each depth at various points into the formation away from the center of the wellbore is considered to be a "2D" description. With such a description we have knowledge of how the property changes as we move laterally from the surface of the borehole wall further into the rock. We, however, still have no knowledge of how the property varies in different directions around the borehole.

A description of a property at any depth and in any direction is considered to be a "3D" description. That is, we have knowledge of the value of the property at any point in space. Such descriptions are rarely seen in wellbore logging.

A description of the value of a property at each point on the surface of the borehole wall in 360 degrees around the borehole is considered to be a "2 and ½ D" description. While it is a representation on a surface (hence, may be a 2D), the surface is curved into a cylinder and occupies space in 3D. Hence, we call such a representation 2 and ½ D to distinguish it from either the 2D or the 3D. It is not 3D because the cylinder is hollow and we do not have a representation at each point in 3D space.

In FIG. 7, the Virtual Core Integrated Formation Evaluation in 2 and ½ D 28. represents a compilation of all formation properties into a digital 2 and ½ D representation because that compilation will express formation petrophysical properties including, but not limited to, porosity, permeability, fluid saturation, mineralogy, rock facies, and mechanical properties, at a level of detail that is resolved by a borehole image log, such as, for example, an electrical or ultrasonic image log.

In FIG. 7, several petrophysical properties vary axially and azimuthally around the borehole over a length scale of an inch to a few inches. Petrophysical properties determined over a length average of several inches to feet do not accurately capture the variability in the rock property. Moreover, petrophysical property determinations from borehole log data need to be calibrated or validated by determinations of similar properties from samples of the formation rocks called cores. Such determinations are typically performed on inch long samples extracted from the cores. In order that proper comparisons be made to corresponding estimates from logs, it is required that both determinations be made over similar length scales. This can be achieved by performing several closely spaced core measurements and averaging over the length scale of the log, which is very expensive to do. Alternately, we need to determine the log derived property over the same length scale as that on the core.

In FIG. 7, some formations depict strong variability of formation properties in one or more directions due to the nature of the processes of their development. Examples are found in thinly laminated sand-shale sequences and in carbonate formations. In order to accurately predict the distribution of fluids within these formations and to predict the movement of such fluids in the formation over the life of the reservoir, it is necessary to describe the formation properties at length scales small enough to capture the variability of the properties. Such a description would permit us to accurately model the behavior of the reservoir. Typically, the required length scale is of the order of a few millimeters to a few centimeters.

However, most log data permit an estimation of the desired property over length scales of a few inches to several feet. Moreover, most log data do not capture the azimuthal variation either because they average over the entire circumference around the borehole (eg. Gamma ray log from the SGT tool) or because they measure along only one direction and average the property over a limited azimuthal arc around the borehole (eg. Bulk density measured by the LDT tool). We will refer to these logs as 1D measurements of a formation property since they provide us one value of a formation property at a given depth in the borehole. Most borehole log measurements measure physical properties of the formation such as resistivity, bulk density, acoustic velocity, thermal neutron decay time, and so on. We combine several such logs to estimate petrophysical properties of the formation surrounding the borehole, such as porosity, permeability, and so on. Borehole electrical image logs such as from the FMI tool or the RAB tool and borehole ultrasonic image logs such as from the USI tool provide a measurement of the corresponding formation property with a resolution of a few millimeters to a couple of centimeters both axially along the borehole and azimuthally around its circumference. We will refer to these image logs as 2 and ½ D measurements of the corresponding property since they provide us with values of the said property at several points around the borehole wall or several azimuthal directions around the borehole at any given depth in the borehole. The electrical image logs from the RAB tool provide measurement of the formation resistivity at three diameters into the formation around the borehole. Hence, such a log provides information on the resistivity of the formation on a 3D shape representing a hollow cylinder with inner diameter corresponding to the shallowest diameter of measurement and outer diameter corresponding to the deepest depth of measurement. The methods prescribed herein may equally be applied to such a borehole image log thereby generating a true 3D representation of formation properties around the borehole. Such an application of these methods should be considered the disclosed subject matter.

There already exist other borehole log measurements such as the ADN (Azimuthal Density Neutron tool), Azimuthal Gamma Ray and the ARI (Azimuthal Resistivity Imager) which provide a low resolution measurement of the corresponding formation property in both depth and azimuth around the borehole wall. Such measurements may be combined to yield a low resolution 2 and ½ D estimation of formation petrophysical properties in depth and azimuth along the borehole. Combinations of a gamma ray log, resistivity log and neutron and density logs to can be used to generate a petrophysical evaluation of formation properties such as porosity, lithology, saturations and permeability. Given the above azimuthal direction around the borehole, it can similarly be determined the above formation properties along each of the same azimuthal directions around the borehole. By then combining all the azimuths, a description of the formation properties may be determined in depth and azimuth along the borehole. The methods prescribed herein may then be applied along each azimuthal sector to combine with a high resolution borehole image log, such as resistivity or acoustic impedance, to generate a high resolution 2 and ½ D representation of formation properties around the borehole (virtual core). Such an application of these methods should also be considered within the scope of this invention.

In FIG. 7, there exists a procedure to develop a 2 and ½ D image of any formation property that can be directly related to the property measured in the 2 and ½ D image log through a relationship of the form, 1D Property=f (2 and ½ D Property, Auxilliary) (refer to European Patent Application EP1016883). Such a relationship might be conceived if the 1D property be a porosity or density and the 2 and ½ D property be resistivity. However, most formation properties such as mineral concentrations, mechanical properties and facies may not be related to the 2 and ½ D property in the above manner. Hence, with the current state of the art, we do not have a method or methods to develop a 2 and ½ D description of many formation properties at a spatial resolution of a few millimeters to a few centimeters. As a result our ability to calibrate/validate our evaluation of such properties by comparison with similar measurements on core is severely limited.

In FIG. 7, a method is illustrated for generating a Virtual Core 28 representing 2 and ½ D description of most formation properties (referred herein as primary magnitudes) given: (1) these same properties measured or estimated on 1D along the borehole, and (2) a 2 and ½ D image of a physical magnitude such as, for example, resistivity or acoustic impedance (referred herein as secondary physical magnitude). The method proposed here is equally applicable to a borehole image log of any geometry or dimensionality. Hence, the method of FIG. 7 can also be used to develop, for example, a 3D description of most formation properties given a 3D image of the secondary physical magnitude.

In FIG. 7, the integrated formation evaluation in 1D 80 generates the following information: (1) formation petrophysical properties including, but not limited to, porosity, clay content, saturation, and permeability information in 1D 82, (2) facies information in 1D 84 also called facies 84, and (3) mechanical properties and reservoir dynamic properties information in 1D 86. In FIG. 7, three separate steps 88, 90, and 92 are each responsive, respectively, to the information in 1D 82, 84, and 86 generated by the integrated formation evaluation in 1D 80 for collectively generating a Virtual Core Integrated Formation Evaluation in 2 and ½ D 28. The Virtual Core Integrated Formation Evaluation in 2 and ½ D 28 in FIG. 7 represents a compilation of all formation properties into a digital 2 and ½ D representation. The advantage of such a compilation is that it permits various displays and interactions, to be discussed later in this specification. The Virtual Core Integrated Formation Evaluation in 2 and ½ D 28 of FIG. 7 is illustrated in FIGS. 3, 4, and 5 as the Virtual Core 28. The Virtual Core Integrated Formation Evaluation in 2 and ½ D 28 generates a plurality of formation properties at each point along the Virtual Core itself As a result, the Virtual Core 28 may be described either in 2 and ½ D (properties at a surface representing the borehole wall) or in 3D (properties on a shell of inner and outer thickness determined by the inner and outer diameter measurement of the primary physical magnitude), where the shape of the property description is determined by the shape of the primary physical magnitude description.

In FIG. 7, note step 81 which is a decision triangle that says: "Can the formation property be related to the property in the borehole image?". If answer to step 81 is yes, step 88 is practiced. However, if the answer to step 81 is no, steps 90 and 92 are practiced. In light of the question asked in the decision triangle of step 81 (can the formation property be related to the property in the borehole image?), each of the steps 88, 90, and 92 of FIG. 7 will be discussed in detail hereinbelow.

In FIG. 7, the following discussion will center on Step 88 in FIG. 7—"Create a 2 and ½ D representation of said 1D property, such as porosity, that can be related to the 2 and ½ D image 94"

In FIG. 7, in response to theporosity, clay content, saturation, and permeability information in 1D 82 from the integrated formation evaluation in 1D 80, step 88 in FIG. 7 entitled Create a 2 and ½ D representation of said 1D property that can be related to the 2 and ½ D image will generate a 2 and ½ D representation of a formation property (that can be related to the 2 and ½ D image) 96. We measure formation properties in many ways. A 2 and ½ D measurement of a formation property is currently restricted to electrical and acoustic measurements. However, several other formation properties must also be made available in 2 and ½ D. Most of the properties can be measured or estimated in 1D.

Step 88 in FIG. 7 ("Create a 2 and ½ D representation of said 1D property that can be related to the 2 and ½ D image") utilizes the concepts set forth in European Patent Application 1 016 883 A1 (hereinafter called "EP application 1,016,883"), published Jul. 5, 2000, by Herve Anxionnaz, and Jean-Pierre Delhomme, and entitled "A method of obtaining a developed two-dimensional image of the wall of a borehole". The aforementioned EP application 1,016,883 is incorporated by reference into the specification of this application. The EP application 1,016,883 specifies a procedure, hereinafter called a first concept, to create a 2 and ½ D representation of any physical 1D measurement or 1D formation property that could be related to the existing 2 and ½ D image (as noted earlier, an example of an existing 2 and ½ D image is the aforementioned borehole electrical or acoustic impedance image). For example, the EP application 1,016,883 can map 1D density measurements set forth in a borehole log produced by the aforementioned Litho-Density Tool with a 2 and ½ D resistivity measurement produced by the Formation Microimager (FMI) tool or the Resistivity at Bit (RAB) tool into a 2 and ½ D representation of density, since the physical 1D measurement of density can be related to the existing 2 and ½ D electrical or acoustic measurement. The EP application 1,016,883 relates to a method of obtaining a developed two-dimensional image of the wall of a borehole (i.e., a 2 and ½ D image); that is, the method creates a 2 and ½ D representation of any physical 1D measurement that could be related to the existing 2 and ½ D image, by: (1) measuring a primary physical magnitude in a borehole as a function of both depth and of azimuth, (2) measuring a secondary physical magnitude in the borehole as a function of depth, (3) establishing a relationship (f) between the primary physical magnitude and the secondary physical magnitude, and (4) deducing from the relationship (f) values for the secondary physical magnitude as a function of both depth and of azimuth, which makes it possible to reconstruct a two-dimensional image developed over the wall of a borehole (a 2 and ½ D image) concerning a secondary physical magnitude which is measured in the borehole as a function of depth only. The FMI tool or the RAB tool will provide the primary physical magnitude referenced above. However, there are several formation properties that cannot be directly related to the 2 and ½ D measurement. Mapping the few properties (into the 2 and ½ D domain) that can be directly related to the 2 and ½ D representation (i.e., properties that can be mapped into the 2 and ½ D domain by the aforementioned EP application 1,016,883) does not yield sufficient information that would justify the use of the term "Virtual Core".

As a result, in accordance with one aspect of the present invention, the formation rock can be considered as an assemblage of a limited number of rock types or facies. Each rock type is an end-member that can be uniquely described by a set of formation properties. For instance, the formation can be broken down into four rock types—coarse sand, fine sand, silt and shale. Each of these rock types have a unique set of formation properties, such as porosity, permeability, Youngs modulus, etc. Hence, by knowing the rock type, we know the formation properties associated with that rock type. Therefore, if we can develop a 2 and ½ D representation of the rock type, we can further develop a 2 and ½ D representation of any of its formation properties.

However, in a software called "BorTex", developed by Schlumberger Technology Corporation of Houston, Texas, the following second concept is performed: a high resolution 1D resistivity log is combined with a low resolution 1D facies log to generate a high resolution 1D facies log. Since a 2 and ½ D measurement is, in fact, a resistivity image, it was realized that the following third concept could be practiced: a 2 and ½ D resistivity image could also be combined with a low resolution 1D facies log to create a 2 and ½ D facies image. In FIG. 7, this leads us to a discussion of step 90 in FIG. 7 entitled "Combine a 2 and ½ D resistivity image and a low resolution 1D facies log to create a 2 and ½ D facies image".

In FIG. 7, the following discussion will center on Step 90 in FIG. 7—"Combine a 2 and ½ D resistivity image and a low resolution 1D facies log to create a 2 and ½ D facies image"

In FIG. 7, step 90, we can now bring in and utilize one or more image logs acquired from the Formation Micro Imager (FMI) tool or the Resistivity at Bit (RAB) tool, both of which are tools that are owned and operated by Schlumberger Technology Corporation of Houston, Texas. The image logs of the FMI tool or the RAB tool provide a primary physical magnitude to be discussed hereinbelow. In FIG. 7, note that step 90 ("Combine a 2 and ½ D resistivity image and a low resolution 1D facies log to create a 2 and ½ D facies image") is responsive to the 2 and ½ D resistivity image 94 and to the facies 84 generated by the integrated formation evaluation in 1D 80 for generating a 2 and ½ D facies image 98. In FIG. 7, the 2 and ½ D facies image 98 output by step 90 is used by two other steps to be discussed hereinbelow: by the Derive from End Members step 92 and by the Virtual Core Integrated Formation Evaluation in 2 and ½ D step 28.

In FIG. 7, as noted earlier, in view of the aforementioned second concept practiced by the BorTex software, it was realized that the following new third concept could be practiced: a 2 and ½ D resistivity image 94 can be combined with a low resolution 1D facies log 84 to create a 2 and ½ D facies image 98. In FIG. 7, step 90 ("Combine a 2 and ½ D resistivity image and a low resolution 1D facies log to create a 2 and ½ D facies image") utilizes the above referenced new third concept, as follows: a 2 and ½ D resistivity image 94 is combined with a low resolution 1D facies log 84 to create a 2 and ½ D facies image 98. In FIG. 7, step 90, the aforementioned FMI tool and the RAB tool will provide the above referenced primary physical magnitudes. By using the above referenced new third concept (a 2 and ½ D resistivity image 94 is combined with a low resolution 1D facies log 84 to create a 2 and ½ D facies image 98), we can now map formation properties into a 2 and ½ D domain.

In FIG. 7, while the aforementioned first concept, practiced by step 88 of FIG. 7 and set forth in EP application 1,016,883, can be directly used to map those formation properties that can be directly related to a measurement in an image log (e.g., the measurement of resistivity produced by the FMI tool or the RAB tool), discrete formation properties, such as facies, can be mapped using the aforementioned third concept (a 2 and ½ D resistivity image 94 is combined with a low resolution 1D facies log 84 to create a 2 and ½ D facies image 98) that is practiced by step 90 in FIG. 7. The third concept (a 2 and ½ D resistivity image 94 is combined with a low resolution 1D facies log 84 to create a 2 and ½ D facies image 98) used in step 90 of FIG. 7 may be applied equally to a non-physical secondary magnitude, such as a facies log. A facies log consists of the assignment of a unique identification number to each rock of a given type. The facies log is a record versus depth of this unique number.

The third concept (a 2 and ½ D resistivity image 94 is combined with a low resolution 1D facies log 84 to create a 2 and ½ D facies image 98) includes the assignment of a range of values of the primary magnitude for each rock type in the 2 and ½ D domain for a given rock type in the secondary magnitude; This establishes a relationship between the primary and secondary magnitudes. This method may be used to develop a 2 and ½ D image of the rock facies distribution. Properties, such as mechanical properties and reservoir dynamic properties 86 and detailed mineralogy, which are more difficult to directly link to the primary physical magnitude, can then be estimated in the 2 and ½ D domain from the average value of the property for a pure sample of the corresponding rock facies type. Such an average value may be determined by measurements performed on a core sample extracted from a rock determine as a pure example of the said facies type. Alternately, it may be determined from log responses in a thick layer consisting solely of the said facies type. Essentially, we distribute such properties in accordance with the rock facies type determined in the developed 2 and ½ D image. We refer to the 2 and ½ D representation of the formation properties as a "Virtual Core Integrated Formation Evaluation in 2 and ½ D" 28. Such a representation will capture formation heterogeneity and has significant implications for Thin Bed Evaluation and for Carbonate Evaluation, both of which are heterogeneity plays.

Referring to FIGS. 7 and 8, the following discussion will center on Steps 91 and 92 in FIG. 7 ("For each facies type in the facies log, determine average values of formation property through tests on pure end member core samples or log data in thick beds" and "Derive from End Members") with reference to FIGS. 7 and 8.

In FIGS. 7 and 8, step 91 ("For each facies type in the facies log, determine average values of formation property through tests on pure end member core samples or log data in thick beds") of FIG. 7 will construct the End Member Property Table 93 of FIG. 8 in response to the Mechanical Properties, Reservoir Dynamic Properties set forth in block 86 of FIG. 7. When step 91 constructs the End Member Property Table 93 of FIG. 8, step 92 of FIG. 7 (Derive from End Members) is then responsive to the 2 and ½ D facies 98 developed by step 90 for generating a 2 and ½ D representation of any formation property 100. Now that step 90 has generated the 2 and ½ D facies image 98, by reference to the End Member Property Table 93 of FIG. 8, a 2 and ½ D representation of any formation property 100 can be determined in response to the 2 and ½ D facies image 98. Step 88 (Create a 2 and ½ D representation of said 1D property that can be related to the 2 and ½ D image), which is the direct approach, should be utilized for those properties (e.g., porosity, saturation, etc.) that can be directly related to the 2 and ½ D image. However, for only those properties that cannot be directly related to the 2 and ½ D representation, step 92 (Derive from End Members), which is the facies and end-member approach, should be utilized because it utilizes the End Member Property Table 93 of FIG. 8. This is represented in step 81 ("Can the formation property be related to the property in the borehole image?"). That is, in connection with step 92 (Derive from End Members) of FIG. 7, once we have the 2 and ½ D facies image 98, by reference to the End Member Property Table 93 of FIG. 8, we can determine a 2 and ½ D representation of any formation property 100. Step 92 will receive the 2 and ½ D facies image 98, refer to the End Member Property Table 93 of FIG. 8, and use the received 2 and ½ D facies image 98 to determine a corresponding 2 and ½ D representation of a formation property 100. Step 88 of FIG. 7 should be used for those formation properties (e.g., porosity and saturation) that can be directly related to the 2 and ½ D representation; however, steps 90 and 92, representing the facies and end member approach should be used for only those properties that cannot be directly related to the 2 and ½ D representation.

In FIG. 7, step 28 (Virtual Core Integrated Formation Evaluation in 2 and ½ D) is generated in response to the 2 and ½ D representation of a 1D formation property 96 from step 88, the 2 and ½ D facies image 98 from step 90, and the 2 and ½ D representation of any formation property 100 from step 92. However, at the end of this process defined by steps 88 and 90 and 92 in FIG. 7, we will have generated a compilation of formation property data referred to as the Virtual Core Integrated Formation Evaluation in 2 and ½ D 28 which represents a 2 and ½ D representation of any formation property. That is, the Virtual Core Integrated Formation Evaluation in 2 and ½ D 28 is a compilation of formation property data as a function of depth and azimuth in a wellbore. Stated differently, the Virtual Core Integrated Formation Evaluation in 2 and ½ D 28 is a representation of any formation property as a function of depth and azimuth in a wellbore. Such a compilation can truly be called a Virtual Core, such as the Virtual Core 28 of FIGS. 3, 4, and 5.

Referring to FIG. 9, a compressed picture of the Virtual Core 28, that is taken along a length of a customers well, is illustrated. The customer is capable of zooming-in on a particular portion of the customers well at a particular depth. That is, the customer can actually select and zoom-in on a particular portion of the customers well 102a which is identified by the dotted box 102a in FIG. 9. When the customer zooms-in on the particular portion of the customers well 102a, a portion of the previously referenced virtual core 28, hereinafter called the virtual core 102, is selected. The selected virtual core 102 is displayed on the workstation display screen 30 of FIGS. 3 and 4. The virtual core 102, which is displayed on the workstation display screen 30, is illustrated in FIG. 10.

Figures 10, 11:
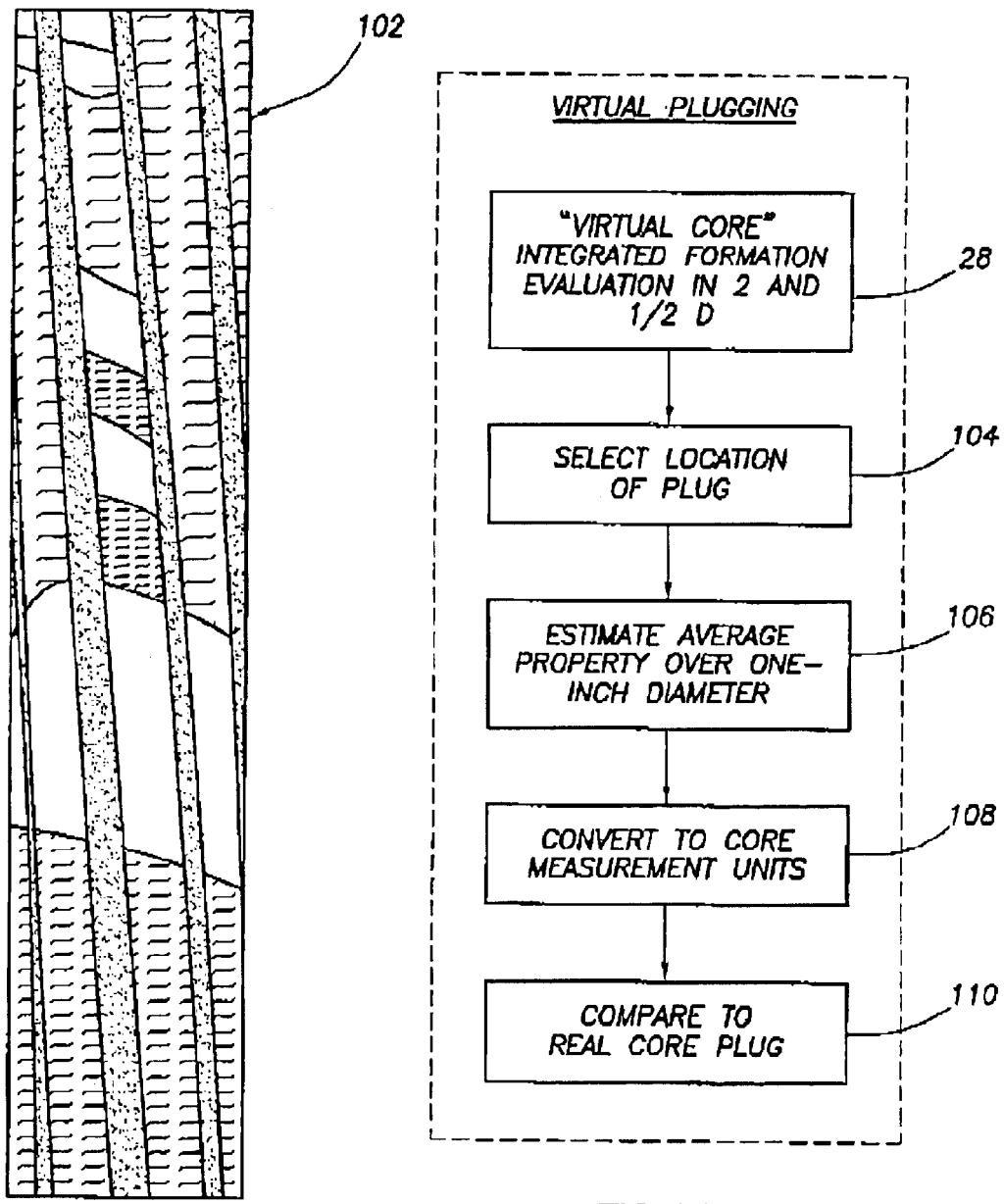
FIG. 10 illustrates a resultant zoomed image of the Virtual Core of FIG. 9 representing a larger view of a particular portion of the customers well at the particular depth from FIG. 9.
FIG. 11 represents a flowchart illustrating that portion of the Virtual Core and Virtual Plug Generation Software of FIG. 5 which generates the Virtual Plug of FIG. 5.

Referring to FIG. 10, the virtual core 102 of FIG. 9 that is being displayed on the workstation display screen 30 of FIGS. 3 and 4, is illustrated. In FIG. 10, the image of the virtual core 102, representing a particular portion of the customers well 102a, looks much more like a real core (such as core 12 in FIG. 1) because the image of the virtual core 102 shown in FIG. 10 was created after using a Formation Micro-Imager (FMI) tool, the FMI tool showing a plurality of macro-features of the Earth formation (the Formation Micro-Imager tool is a tool owned and operated by Schlumberger Technology Corporation of Houston, Tex.).

Referring to FIG. 11, a second concept called Virtual Plugging, in accordance with another aspect of the present invention, is illustrated.

Recall, with reference to step 28 in FIG. 7, that the Virtual Core Integrated Formation Evaluation in 2 and ½ D is a Virtual Core 28, where the Virtual Core 28 represents a high resolution 2 and ½ D description of formation properties along a wellbore. Now that we have derived and determined the virtual core 28 of FIG. 7 (which represents the high-resolution 2 and ½ D description of formation properties along a well bore), it would be desirable to derive a Virtual Plug. The Virtual Plug is an estimate of corresponding formation properties over a volume of formation that is similar in geometry, position, and orientation to that of the real core plug 14 of FIG. 1. The real core plug 14 is a plug that was obtained from the real core 12 of FIG. 1. The real core 12 was extracted from the borehole 10 of FIG. 1.

In FIG. 11, cores obtained in the borehole are analyzed for these same properties. This is often performed by extracting a sample of rock called a plug from the core and subjecting the plug to various measurement processes. Petrophysical properties determined over a length average of several inches to feet do not accurately capture the variability in the rock property. These measurements from core plugs are then used to calibrate/validate the interpretation of well logs for the same properties. Several petrophysical properties vary axially and azimuthally around the borehole over a length scale of an inch to a few inches. This is particularly true of heterogeneous formations, such as thinly laminated shaly sands or carbonates. Proper comparison requires that it be performed on similar or comparable volumes of rock. If we have a high-resolution 2 and ½ D description of the formation properties (i.e., a Virtual Core 28) from log data 22 of FIG. 2, we need to sample this description over a similar orientation, position and geometry to extract values of each formation property that can then be compared with the core plug data for calibration or validation The core industry has used the technique of CT-Scan to generate a hi-resolution 3D density image of a real core and to virtually scan this 3D image to determine optimal locations of a proposed real plug, the aim being to optimally capture the heterogeneity of the core while not ending up with pits or holes on the plug surface that would void many types of measurements to be performed on the plug. The method has only been used to determine the preferred orientation and location of a physical plug and not to directly estimate formation properties from the 3D density image. The method has never been applied to a 2 and ½ D or higher description of formation properties with the aim of deriving property descriptions on the same scale and orientation of a real plug on a real core.

In FIG. 11, a method is illustrated for generating a Virtual Plug from the Virtual Core 28. The method of FIG. 11 for generating the Virtual Plug represents a method for extracting a Virtual Plug (which is an appropriate representation of a formation property) from the Virtual Core 28 (which is a 2 and ½ D description of the said formation property along a borehole) at a given location, orientation and geometry similar to that of a physical or real plug 14 obtained on a real core 12 from the same borehole 10. Recall that the Virtual Core 28 may be described either in 2 and ½ D (properties at a surface, such as a cylindrical surface, representing a borehole wall) or in 3D (properties on a shell, such as a cylindrical shell, of inner and outer thickness determined by the inner and outer diameter of measurement of the primary physical magnitude). The concept of Virtual Plugging is a process whereby, in response to a detailed high-resolution 2 and ½ D or 3D description of the formation properties (i.e., the Virtual Core 28), we derive an average estimate of all formation properties (i.e., the average properties) over a prescribed surface (or volume) of size similar to a real plug 14 in the vicinity of a selection made by the user. These average properties can be listed in the form of a table, where there exists only one value of the parameter (e.g., porosity, intrinsic permeability, mineralogy) or as a chart plotting the variation in one property versus another (e.g., relative permeability to water or oil as a function of the saturation of water). Recalling that the Virtual Core 28 describes a plurality of formation properties at each point on the Virtual Core itself, the step of Virtual Plugging determines how many points on the Virtual Core itself fall within the one-inch diameter circle around the location of the workstation display screen cursor. Then, for each formation property of interest, the Virtual Plugging process computes the appropriate average of that formation property for all the points that fall within the one-inch diameter circle around the location of the cursor. This Virtual Plugging process (for computing the average of that formation property for all the points that fall within the one-inch diameter circle around the location of the cursor) can only be accomplished if and when, at each point on the Virtual Core 28 itself, a compilation of formation properties have already been determined.

In FIG. 11, Virtual plugging is a process by which average formation properties over a small area (around the cross-sectional area of a typical core plug of 1" diameter) are estimated from the 2 and ½ D or 3D Virtual Core image. In FIG. 11, having already generated the Virtual Core Integrated Formation Evaluation in 2 and ½ D 28, the next step toward generation of the Virtual Plug includes a selection of the exact location of the plug on the Virtual Core 28, a selection that is made graphically by the user, step 104 in FIG. 11. The program estimates the average formation properties over a circle of, for example, 1" diameter centered at the selected location, step 106 of FIG. 11. If the Virtual Core image is a 3D image, the formation properties will be averaged over the volume of the virtual plug centered at the position of the cursor, step 106 of FIG. 11. Each property is then converted to units systems used for real core plug measurements, step 108 of FIG. 11. For example, log interpretation provides wet volume percents of the main rock minerals and fluids encountered. The program converts the mineral wet volume percents to mineral dry weight percents as normally reported on real core measurements, step 108 of FIG. 11. This enables the user to compare the results to any real core plug that he may have obtained at that point in the well, step 110 of FIG. 11. This facilitates core-log integration, which is critical to accurate formation evaluation. As a result, in FIGS. 1, 7, 9, and 11, when the Virtual Core integrated formation evaluation in 2 and ½ D 28 of FIG. 7 is completed, the next step includes select the location of a plug, step 104 of FIG. 11, from the virtual core, such as from the virtual core 102 of FIG. 9. The next step includes estimate the average formation property over a 1 inch diameter, block 106 of FIG. 11. The next step includes convert to core measurement units, step 108 of FIG. 11. The last step includes compare to real core plug step 110 of FIG. 11, such as the real core plug 14 of the real core 12 of FIG. 1. The comparison step 110 need be done only if a real core plug exists and has been analyzed for the said formation properties.

Figure 12:
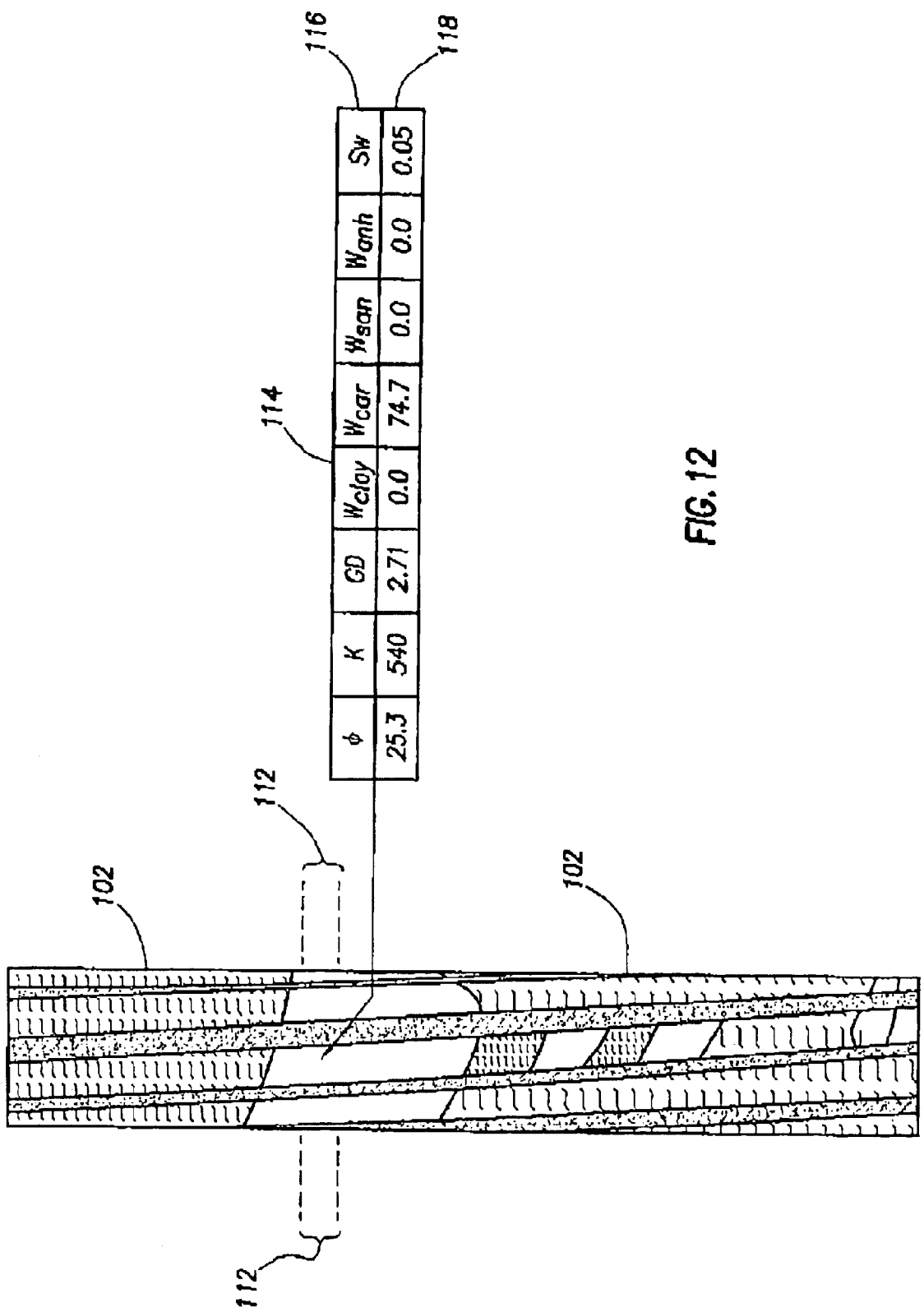
FIG. 12 illustrates how the customer can select a particular piece of the virtual core and generate a virtual plug which displays formation characteristics associated with that particular piece of the virtual core.

Referring to FIG. 12, the customer can now select a particular piece of the virtual core 28 and 102 and, responsive thereto, generate a virtual plug which displays Earth formation characteristics associated with that particular piece of the virtual core. In FIG. 12, the Virtual Core (28 of FIGS. 3–5 and 7 and 102 of FIGS. 9 and 10) is illustrated. In FIG. 12, the customer at workstation 24 can now place the display cursor on the workstation display screen 30 where the Virtual Core 102 is being displayed and select a piece 112 of the virtual core 102 for the purpose of determining the Earth formation characteristics associated with that piece 112 of the virtual core 102. When that piece 112 is selected by the customer, a virtual plug 114 (shown in FIG. 12) will be generated and displayed on the display screen 30 of the workstation 24 of FIG. 4.

Recall that the concept of Virtual Plugging is a process whereby, in response to a detailed high-resolution 2 and ½ D or 3D description of the formation properties (the Virtual Core 28), we can derive and display an average estimate of all formation properties over a prescribed surface or volume (where the average estimate of all formation properties is referred to as the Virtual Plug and it has a size similar to a real plug 14) in the vicinity of a selection 112 made by the user (recall that the customer selected piece 112 on the Virtual Core 102 in FIG. 12). These average properties, called the Virtual Plug, can be listed in the form of a table 114 in FIG. 12, where there exists only one value of a parameter (e.g., porosity, intrinsic permeability, mineralogy) or as a chart plotting the variation in one property versus another (e.g., relative permeability to water or oil as a function of the saturation of water). In FIG. 12, the Virtual Plug 114 is a table 114 comprised of a plurality of Earth formation characteristics 116 in FIG. 12 and a corresponding plurality of numerical values 118 associated, respectively, with the plurality of Earth formation characteristics 116.

Figure 13:
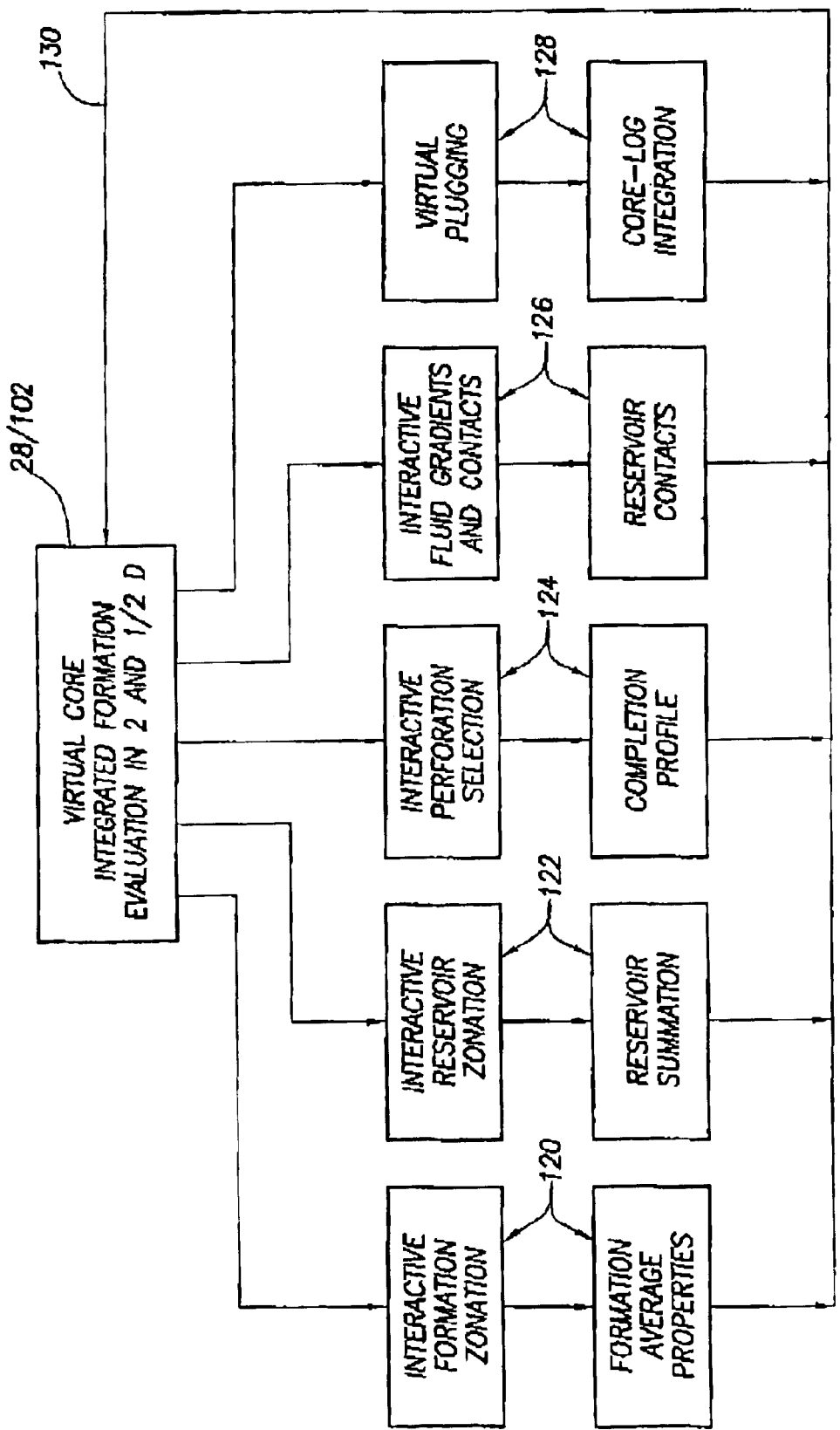
FIG. 13 illustrates how the results of all interactions with the Virtual Core (including interactive formation zonation, interactive reservoir zonation, interactive perforation selection, interactive fluid gradients, and virtual plugging) are restored back on the Virtual Core.

Referring to FIG. 13, a system of-interactions and results, in accordance with another aspect of the present invention, is illustrated. FIG. 13 illustrates a plurality of interactions which can be made in connection with a 2 and ½ D digital representation of the Virtual Core and the re-storage of all results generated by those interactions in the Virtual Core. As a result of the re-storage of all the results generated by those interactions, a current archive of all the formation evaluation knowledge of a wellbore can be created.

In FIG. 13, the system of interactions and results includes the Virtual Core Integrated Formation Evaluation in 2 and ½ D 28/102. The Virtual Core 28/102 can be accessed in order to determine a plurality of formation petrophysical properties including, but not limited to, porosity, permeability, fluid saturation, mineralogy, rock facies, and mechanical properties. The formation petrophysical properties can be determined from a single digital entity on a computer in order to perform one or several interactions which use the digital information to simulate multiple borehole and formation production scenarios, or to derive formation layer scaled up properties for reservoir simulation and to store the results of such interactions on to the same digital entity thereby ensuring that it is a current archive of the information on the well. This digital entity can be delivered in a compact, portable format such as, for example, a USB Flash Drive, for easy transfer of information and program to and from a computer and for archive of the same in a manageable and portable form.

Petrophysical property evaluations provided to a customer need to be incorporated into the customers workflow for reservoir modeling and reservoir simulation. The modeling activity may be of several kinds. The different formation tops and bottoms will need to be identified to locate the well within the framework of the reservoir. Permeable layers within the formations also need to be located in depth. Average petrophysical properties for each layer need to be computed and entered into the reservoir simulation grid. Prior to the production of a well, the customer needs to determine the best interval to place on production in line with his objectives for the well. The customer needs to compare several scenarios involving different intervals to optimize the final choice of interval. To this end, he will need to simulate the production of the different candidate intervals. These are just a few examples of the several interactions a customer will need to perform on the interpreted evaluation of his formation at the well.

In order to perform these interactions, the formation properties at the well need to be delivered to him in digital electronic form. Since the interactions are part of the investigations performed by the customer and since the result of these interactions will influence the decisions taken regarding the management of the well and the reservoir, they will need to be archived for future reference. If the interactions are archived along with the digital data of the well in such a format that they can be accessed upon future access of the data of the well, we can ensure that the details of such interactions are not lost. Current standards for data delivery require that the delivered data be re-loaded onto the customers database. Based on the capability of the customers system, the range of interactions permitted may be limited. Secondly, the results of the interactions may not be stored along with the input data. This allows him to access the game at a future time and revert to the status of the game at the time of the previous exit. In FIG. 13, the system of interactions and results is a mechanism of data delivery, which will result in the maintenance of a current archive of the information on a well on a compact and portable medium. The system of instructions and results of FIG. 13 can be packaged in the form a compact portable re-writeable memory device, such as a USB Flash Drive, in order to deliver to the customer: (a) a detailed description of formation properties along the length and circumference of a wellbore, (b) the necessary software to view the said data, and (c) the necessary software to interact with the data and store the results of the interactions on the memory device.

In FIG. 13, a plurality of results for all interactions (5 shown here) are stored back on the Virtual Core. The plurality of results are indicated by numerals 120, 122, 124, 126, and 128 in FIG. 13 and those plurality of results are stored back on the virtual core via line 130 in FIG. 13. Subsequent referrals to the Virtual Core will show results of all saved interactions. The Virtual Core is the current archive of the formation evaluation knowledge on the well. As a single well deliverable of the formation evaluation answers on a well, the Virtual Core will be provided on a removable medium such as re-writeable USB flash drive. In this form, the results of interactions will be stored back on the removable drive. Connecting the drive to a PC will enable the customer to bring up a current archive of the formation evaluation knowledge on the well. In future versions of the Virtual Core that are installed on top of a customer multi-well database, the Virtual Core is itself tied to the interpretation results in the database. Hence, when new data becomes available on the well, which might change the formation evaluation results, these automatically update the Virtual Core. Subsequent referrals to the Virtual Core on that well will reflect these changes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A program storage device readable by a machine, tangibly embodying a program of instructions executable by the machine, to perform method steps for generating a compilation of formation property data as a function of depth and azimuth in a wellbore, said method steps comprising:

creating, in response to an integrated formation evaluation which includes one or more physical measurements as functions of depth in a wellbore and one or more formation properties as functions of depth in a wellbore and a facies log measurement as a function of depth in the wellbore and an image as a function of depth and azimuth in the wellbore of a physical measurement, a representation of the physical measurements and formation properties as functions of depth and azimuth in the wellbore on the condition that the each of said physical measurements and each of said formation properties as a function of depth in said wellbore can be related to said physical measurement in said image; and combining the physical measurement image as a function of depth and azimuth in said wellbore with the facies log measurement as a function of depth in said wellbore thereby generating a facies image as a function of depth and azimuth in the wellbore and determining a representation of any formation property as a function of depth and azimuth in the wellbore corresponding to the facies image on the condition that said formation property cannot be related to the physical measurement image.

2. A method of generating a compilation of formation property data as a function of depth and azimuth in a wellbore, the method comprising:

creating, in response to an integrated formation evaluation which includes one or more physical measurements as functions of depth in a wellbore and one or more formation properties as functions of depth in a wellbore and a facies log measurement as a function of depth in the wellbore and an image as a function of depth and azimuth in the wellbore of a physical measurement, a representation of the physical measurements and formation properties as functions of depth and azimuth in the wellbore on the condition that the each of the physical measurements and each of the formation properties can be related to said physical measurement in said image; and combining the physical measurement image as a function of depth and azimuth in said wellbore with the facies log measurement as a function of depth in said wellbore thereby generating a facies image as a function of depth and azimuth in the wellbore and determining a representation of any formation property as a function of depth and azimuth in the wellbore corresponding to the facies image on the condition that said formation property cannot be related to the physical measurement image.

3. A program storage device readable by a machine, tangibly embodying a program of instructions executable by the machine, to perform method steps for generating a compilation of formation property data representing a 2 and ½ D representation of any formation property, said method steps comprising:

(a) generating an integrated formation evaluation in 1D including one or more physical 1D measurements, one or more interpreted formation properties in 1D, a 1D facies log and a 2 and ½ D measurement of a physical magnitude;

(b) in response to the 1D property from the integrated formation evaluation and the 2 and ½ D physical magnitude measurement, creating a 2 and ½ D representation of the formation property on the condition that the said property can be related to the 2 and ½ D physical magnitude; and (c) in response to said 1D facies log and to said 2 and ½ D physical magnitude image, combining said 2 and ½ D physical magnitude image with said 1D facies log thereby generating a 2 and ½ D facies image.

4. The program storage device of claim 3, said method steps further comprising:

(d) determining average values of any formation property for each facies type encountered in the facies log and, in response to said 2 and ½ D facies image generated by the combining step (c), determining a 2 and ½ D representation of any formation property that cannot be related to the 2 and ½ D physical magnitude as in step (b) above, said 2 and ½ D representation of the 1D formation property that can be related to the 2 and ½ D physical magnitude, said 2 and ½ D facies image, and said 2 and ½ D representation of any formation property that cannot be related to the 2 and ½ D physical magnitude collectively producing said compilation of formation property data representing said 2 and ½ D representation of any formation property.

5. A method of generating a compilation of formation property data representing a 2 and ½ D representation of any formation property, said method comprising:

(a) generating an integrated formation evaluation in 1D including one or more physical 1D measurements, and one or more interpreted formation properties in 1D, a 1D facies log and a 2 and ½ D measurement of a physical magnitude;

(b) in response to the 1D property from the integrated formation evaluation and the 2 and ½ D physical magnitude measurement, creating a 2 and ½ D representation of the formation property on the condition that the said property can be related to the 2 and ½ D physical magnitude; and (c) in response to said 1D facies log and to said 2 and ½ D physical magnitude image, combining said 2 and ½ D physical magnitude image with said 1D facies log thereby generating a 2 and ½ D facies image.

6. The method of claim 5, further comprising:

(d) determining average values of any formation property for each facies type encountered in the facies log and, in response to said 2 and ½ D facies image generated by the combining step (c), determining a 2 and ½ D representation of any formation property that cannot be related to the 2 and ½ D physical magnitude as in step (b) above, said 2 and ½ D representation of the 1D formation property that can be related to the 2 and ½ D physical magnitude, said 2 and ½ D facies image, and said 2 and ½ D representation of any formation property that cannot be related to the 2 and ½ D physical magnitude collectively producing said compilation of formation property data representing said 2 and ½ D representation of any formation property.

7. A program storage device readable by a machine, tangibly embodying a program of instructions executable by the machine, to perform method steps that are responsive to a compilation of formation property data representing a 2 and ½ D representation of any formation property for deriving an average-estimate of all formation properties over a prescribed surface or volume in the vicinity of a selection made on said compilation, said method steps comprising selecting a location on said compilation, said compilation including one or more formation properties; and estimating an average of each formation property that falls within a predetermined diameter around said location on said compilation which was selected in the selecting step.

8. The program storage device of claim 7, wherein said compilation of formation property data represents formation property data obtained on a wall of a wellbore, a real core plug adapted to be obtained from said wellbore at a location corresponding to said location on said compilation, said method further comprising:

converting said average of each formation property estimated in the estimating step to units systems; and comparing said units systems associated with said average of said each formation property with said real core plug thereby facilitating core-log integration and accurate formation evaluation.

9. A method responsive to a compilation of formation property data representing a 2 and ½ D representation of any formation property for deriving an average estimate of all formation properties over a prescribed surface or volume in the vicinity of a selection made on said compilation, said method comprising:

selecting a location on said compilation, said compilation including one or more formation properties; and estimating an average of each formation property that falls within a predetermined diameter around said location on said compilation which was selected in the selecting step.

10. The method of claim 9, wherein said compilation of formation property data represents formation property data obtained on a wall of a wellbore, a real core plug adapted to be obtained from said wellbore at a location corresponding to said location on said compilation, said method further comprising:

converting said average of each formation property estimated in the estimating step to units systems; and comparing said units systems associated with said average of said each formation property with said real core plug thereby facilitating core-log integration and accurate formation evaluation.

11. A program storage device readable by a machine, tangibly embodying a program of instructions executable by the machine, to perform method steps for deriving an average estimate of all formation properties over a prescribed surface or volume, said method steps comprising (a) generating an integrated formation evaluation in 1D including one or more physical 1D measurements, and one or more interpreted formation properties in 1D, a 1D facies log, and a 2 and ½ D measurement of a physical magnitude;

(b) in response to the 1D property from the integrated formation evaluation and the 2 and ½ D physical magnitude measurement, creating a 2 and ½ D representation of the formation property on the condition that the said property can be related to the 2 and ½ D physical magnitude;

(c) in response to said 1D facies log and to said 2 and ½ D physical magnitude image, combining said 2 and ½ D physical magnitude image with said 1D facies log thereby generating a 2 and ½ D facies image;

(d) determining average values of any formation property for each facies type encountered in the facies log and, in response to said 2 and ½ D facies image generated by the combining step (c), determining a 2 and ½ D representation of any formation property that cannot be related to the 2 and ½ D physical magnitude as in step (b) above, said 2 and ½ D representation of the 1D formation property that can be related to the 2 and ½ D physical magnitude, said 2 and ½ D facies image, and said 2 and ½ D representation of any formation property that cannot be related to the 2 and ½ D physical magnitude collectively producing said compilation of formation property data representing said 2 and ½ D representation of any formation property;

(e) selecting a location on said compilation, said compilation including one or more formation properties; and (f) estimating an average of each formation property that falls within a predetermined diameter around said location on said compilation which was selected in the selecting step.

12. The program storage device of claim 11, wherein said compilation of formation property data represents formation property data obtained on a wall of a wellbore, a real core plug adapted to be obtained from said wellbore at a location corresponding to said location on said compilation, said method further comprising:

(g) converting said average of each formation property estimated in the estimating step to units systems; and (h) comparing said units systems associated with said average of said each formation property with said real core plug thereby facilitating core-log integration and accurate formation evaluation.

13. A method for deriving an average estimate of all formation properties over a prescribed surface or volume, said method comprising:

(a) generating an integrated formation evaluation in 1D including one or more physical 1D measurements, and one or more interpreted formation properties in 1D, a 1D facies log and a 2 and ½ D measurement of a physical magnitude, said physical magnitude including either resistivity or acoustic impedance;

(b) in response to the 1D property from the integrated formation evaluation and the 2 and ½ D physical magnitude measurement, creating a 2 and ½ D representation of the formation property on the condition that the said property can be related to the 2 and ½ D physical magnitude;

(c) in response to said 1D facies log and to said 2 and ½ D physical magnitude image, combining said 2 and ½ D physical magnitude image with said 1D facies log thereby generating a 2 and ½ D facies image;

(d) determining average values of any formation property for each facies type encountered in the facies log and, in response to said 2 and ½ D facies image generated by the combining step (c), determining a 2 and ½ D representation of any formation property that cannot be related to the 2 and ½ D physical magnitude as in step (b) above, said 2 and ½ D representation of the 1D formation property that can be related to the 2 and ½ D physical magnitude, said 2 and ½ D facies image, and said 2 and ½ D representation of any formation property that cannot be related to the 2 and ½ D physical magnitude collectively producing said compilation of formation property data representing said 2 and ½ D representation of any formation property;

(e) selecting a location on said compilation, said compilation including one or more formation properties; and (f) estimating an average of each formation property that falls within a predetermined diameter around said location on said compilation which was selected in the selecting step.

14. The method of claim 13, wherein said compilation of formation property data represents formation property data obtained on a wall of a wellbore, a real core plug adapted to be obtained from said wellbore at a location corresponding to said location on said compilation, said method further comprising:

(g) converting said average of each formation property estimated in the estimating step to units systems; and (h) comparing said units systems associated with said average of said each formation property with said real core plug thereby facilitating core-log integration and accurate formation evaluation.

15. A program storage device readable by a machine, tangibly embodying a program of instructions executable by the machine, to perform method steps responsive to a compilation of formation property data as a function of depth and azimuth in a wellbore for interacting with said compilation, said method steps comprising:

interacting with said compilation of formation property data as a function of depth and azimuth in said wellbore thereby generating at least one result; and storing said at least one result back into said compilation in response to the interacting step.

16. A method responsive to a compilation of formation property data as a function of depth and azimuth in a wellbore for interacting with said compilation, said method comprising:

interacting with said compilation of formation property data as a function of depth and azimuth in said wellbore thereby generating at least one result; and storing said at least one result back into said compilation in response to the interacting step.

17. A method for representing earth formation properties of a region surrounding a borehole, comprising the steps of:

obtaining a first set of data representing a first property of an earth formation for a first region surrounding a borehole, the first set of data representing the first property in a first dimensionality having, a first resolution;

obtaining a second set of data representing a second property of an earth formation for a first region surrounding the borehole, the second set of data representing the second property in a second dimensionality having a second resolution, the second resolution being higher than the first resolution;

generating a representation of the first region of the earth formation, the representation based on a combination of the first set of data and the second set of data and having a third dimensionality and a third resolution at least equal to the second dimensionality and the second resolution.

18. The method of claim 17, further comprising the step of:

generating a second representation of a second region of an earth formation adjacent to the first region, the second representation based on a combination of the first set of data and the second set of data and having a third dimensionality and a third resolution at least equal to the second dimensionality and the second resolution.

19. The method of claim 18, further comprising the step of:

displaying in a viewable medium, the first and second representations;

displaying a description of the earth formation properties associated with a portion of the first and second representations as selected by a user.

20. The method of claim 18, where in the first and second representations are multi-dimensional representations along a depth and an azimuth of the borehole.

21. The method of claim 17, wherein at least one of the first or second sets of data are obtained from physical measurements of formation properties.

22. The method of claim 20, wherein the first set of data is based on data obtained from a earth formation core extraction.

23. The method of claim 17, wherein at least one of the first or second sets of data are obtained from interpretations based on physical measurements of formation properties.

24. The method of claim 17, further comprising the step of:

simulating completion and production scenarios based on the representation; and selecting a preferred scenario based on the simulations.

25. The method of claim 17, wherein at least one of the first or second sets of data obtained from the group of a gamma ray log, a resistivity log and a neutron and density log.

* * * * *